(12) United States Patent
Kawafuji

(10) Patent No.: US 11,660,877 B2
(45) Date of Patent: May 30, 2023

(54) IMAGE PROCESSING APPARATUS, IMAGE PROCESSING METHOD, AND INKJET PRINTING APPARATUS

(71) Applicant: CANON KABUSHIKI KAISHA, Tokyo (JP)

(72) Inventor: Hiroshi Kawafuji, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 31 days.

(21) Appl. No.: 17/337,150

(22) Filed: Jun. 2, 2021

(65) Prior Publication Data
US 2021/0283925 A1 Sep. 16, 2021

Related U.S. Application Data

(63) Continuation of application No. 16/214,880, filed on Dec. 10, 2018, now Pat. No. 11,052,671.

(30) Foreign Application Priority Data

Dec. 15, 2017 (JP) .............................. JP2017-241107

(51) Int. Cl.
*B41J 2/21* (2006.01)
*G06K 15/10* (2006.01)
*B41J 2/52* (2006.01)
*H04N 1/405* (2006.01)

(52) U.S. Cl.
CPC ............... *B41J 2/2132* (2013.01); *B41J 2/52* (2013.01); *G06K 15/102* (2013.01); *G06K 15/107* (2013.01); *H04N 1/4055* (2013.01)

(58) Field of Classification Search
CPC ......... B41J 2/2132; B41J 2/52; G06K 15/102; H04N 1/4055
See application file for complete search history.

(56) References Cited

U.S. PATENT DOCUMENTS

| 6,557,964 | B2 | 5/2003 | Kawatoko et al. |
| 7,699,436 | B2 | 4/2010 | Shibata et al. |
| 8,287,091 | B2 | 10/2012 | Kyoshima et al. |
| 2002/0021319 | A1 | 2/2002 | Kawatoko et al. |
| 2009/0073202 | A1* | 3/2009 | Kanda .................. B41J 19/142 347/9 |

FOREIGN PATENT DOCUMENTS

| JP | 10-109442 A | 4/1998 |
| JP | 2002-29097 A | 1/2002 |
| JP | 2004-1560 A | 1/2004 |
| JP | 6131216 B2 | 5/2017 |

* cited by examiner

*Primary Examiner* — Thinh H Nguyen
(74) *Attorney, Agent, or Firm* — Venable LLP

(57) ABSTRACT

For a multi-pass printing, an image of a unit area is printed by M printing scans of M print regions of first and second nozzle arrays. Each of N pieces of column data is printed by a different printing scan. Ejection data for the first nozzle array is generated using a first mask pattern and ejection data for the second nozzle array is generated using a second mask pattern different from the first mask pattern, for each of the N pieces of column data. On that basis, the first mask pattern and the second mask pattern have a complementary relationship in each of the M print regions. Further, in each of the first mask pattern and the second mask pattern, a combination of print regions, of the M print regions, for printing dots at the same position on the print medium has a mutually complementary relationship.

27 Claims, 17 Drawing Sheets

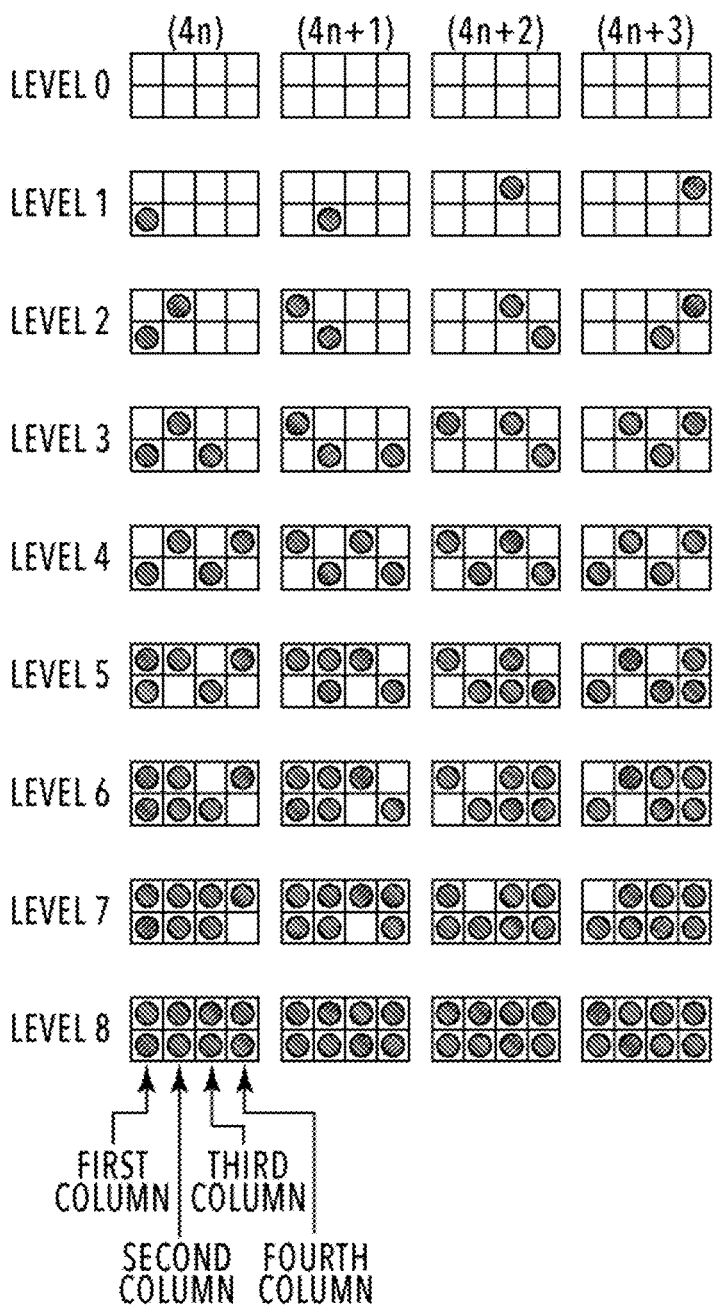
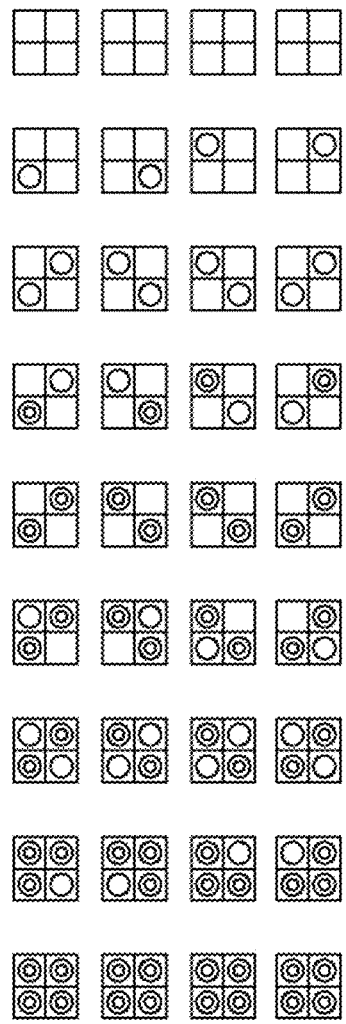
FIG.4A
FIG.4B

FIG.10A
MASK PATTERN FOR FIRST NOZZLE ARRAY
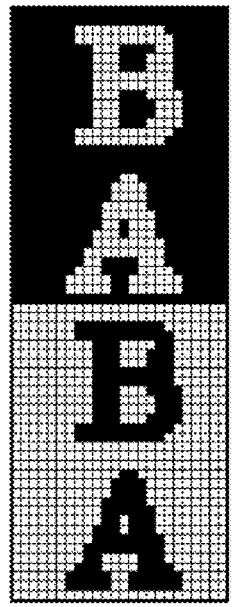 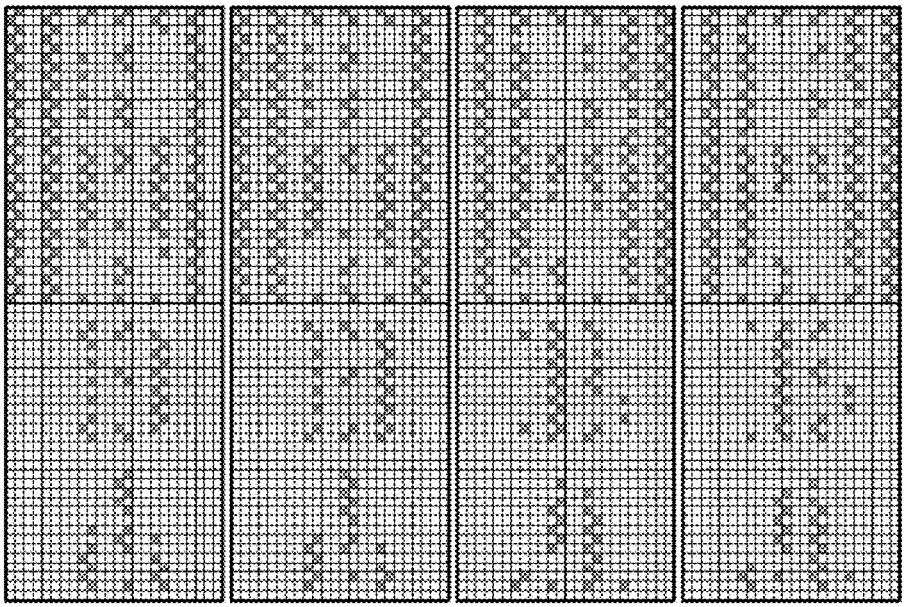
COLUMN 1  COLUMN 2  COLUMN 3  COLUMN 4
MASK PATTERN FOR SECOND NOZZLE ARRAY
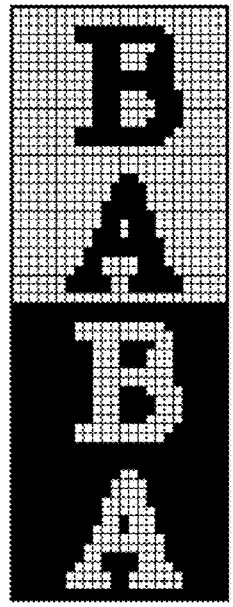 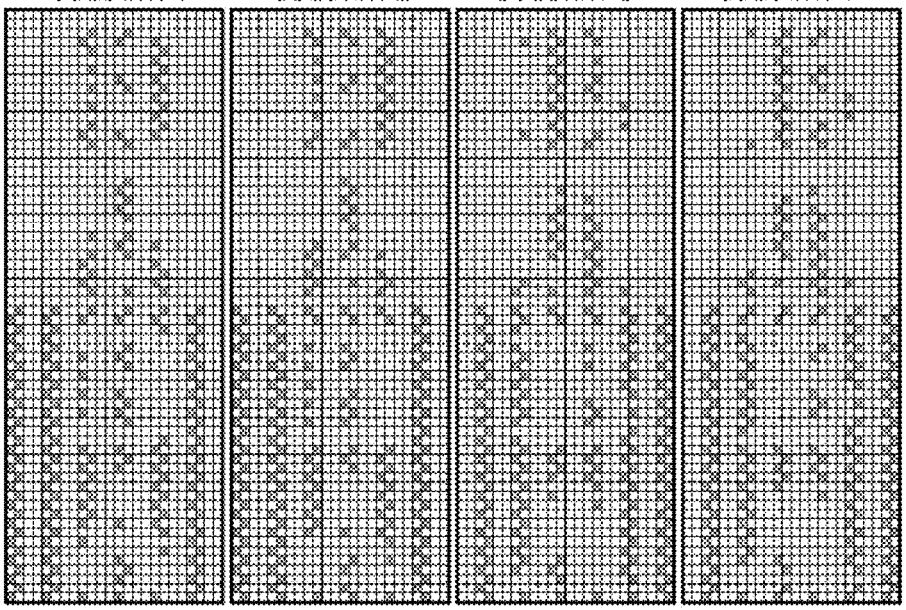
COLUMN 1  COLUMN 2  COLUMN 3  COLUMN 4
FIG.10B
NO POSITION ERROR OCCURS 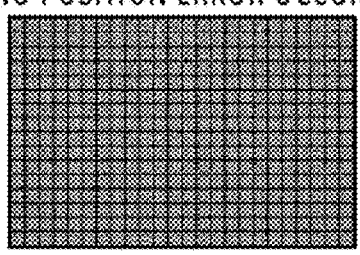
POSITION ERROR OCCURS 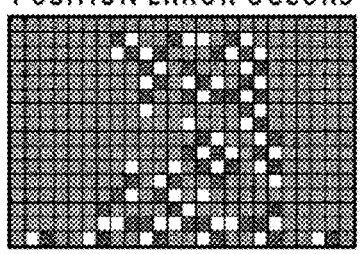
■ TWO DOTS OVERLAID
▨ ONE DOT
□ NO DOT

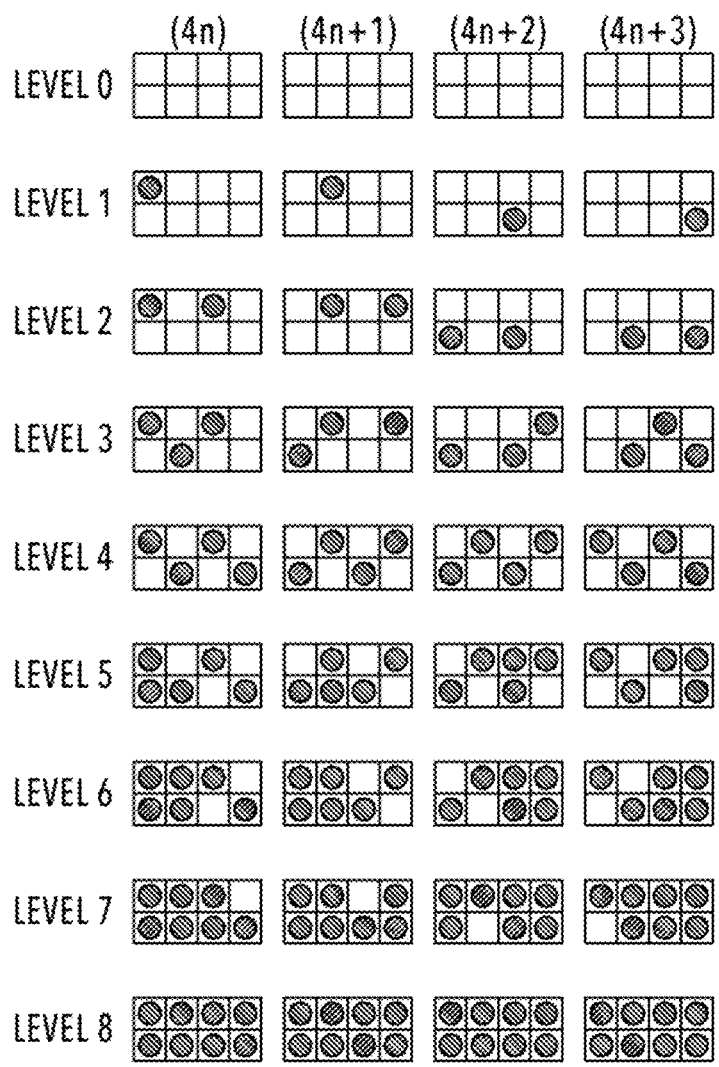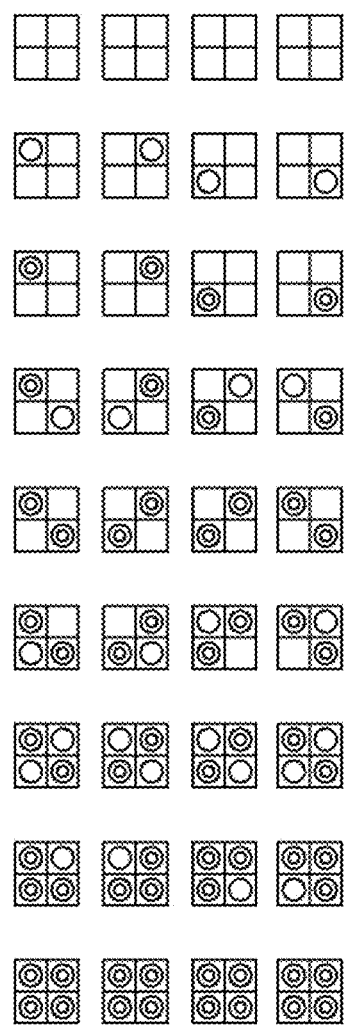

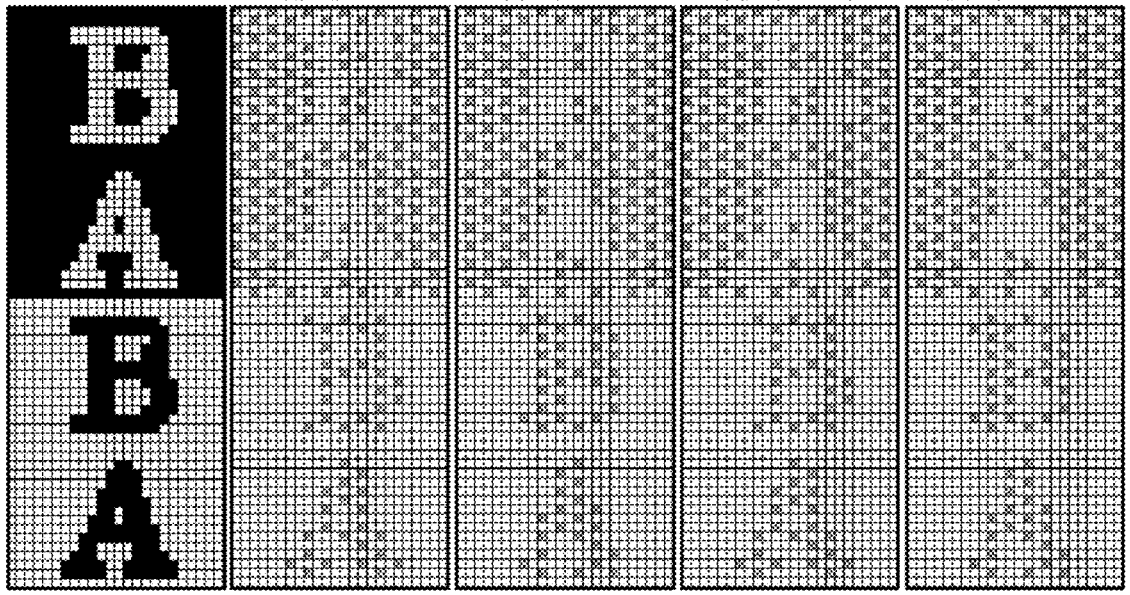
FIG.13A
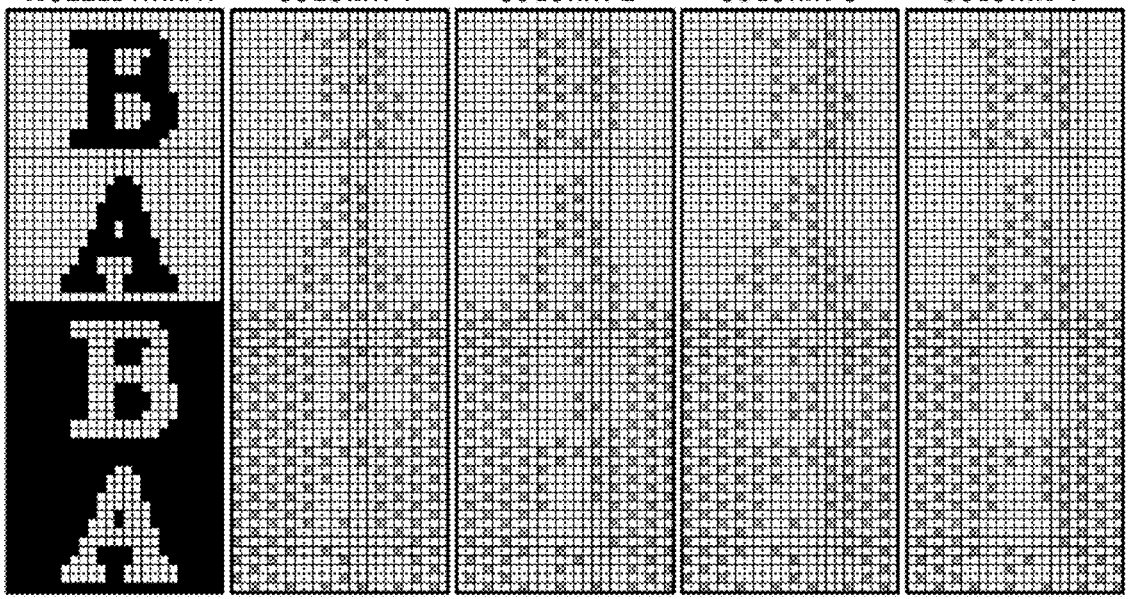
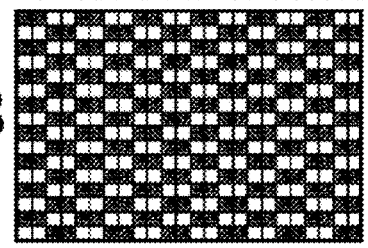
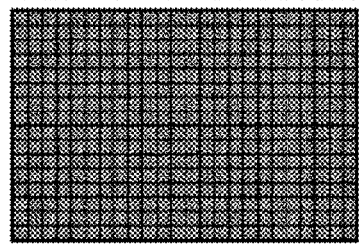
FIG.13B

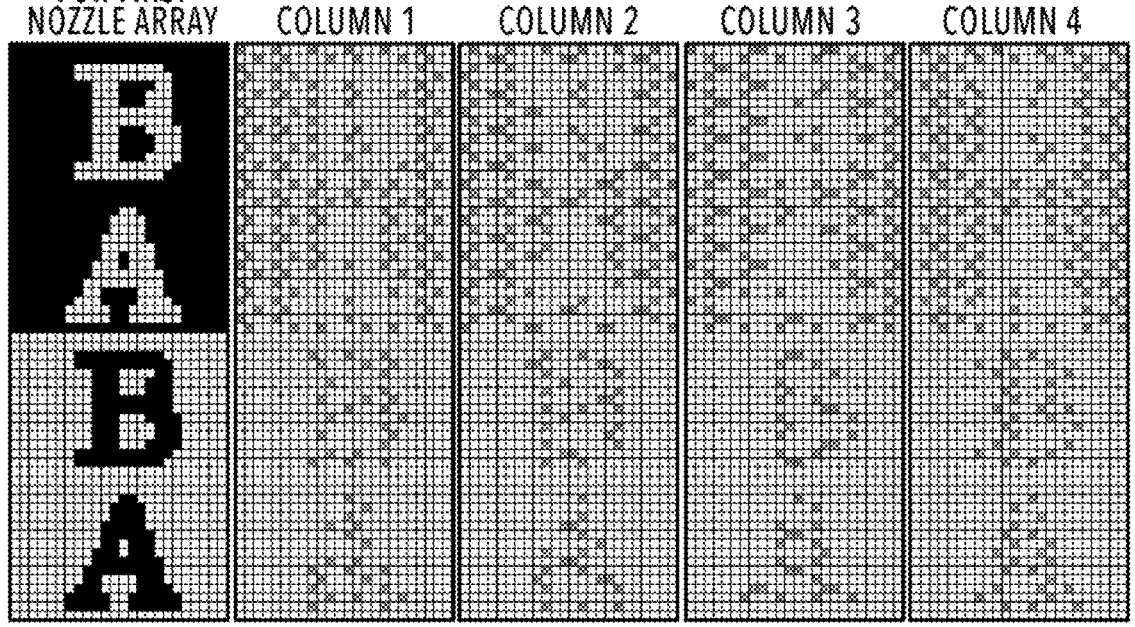
FIG.17A
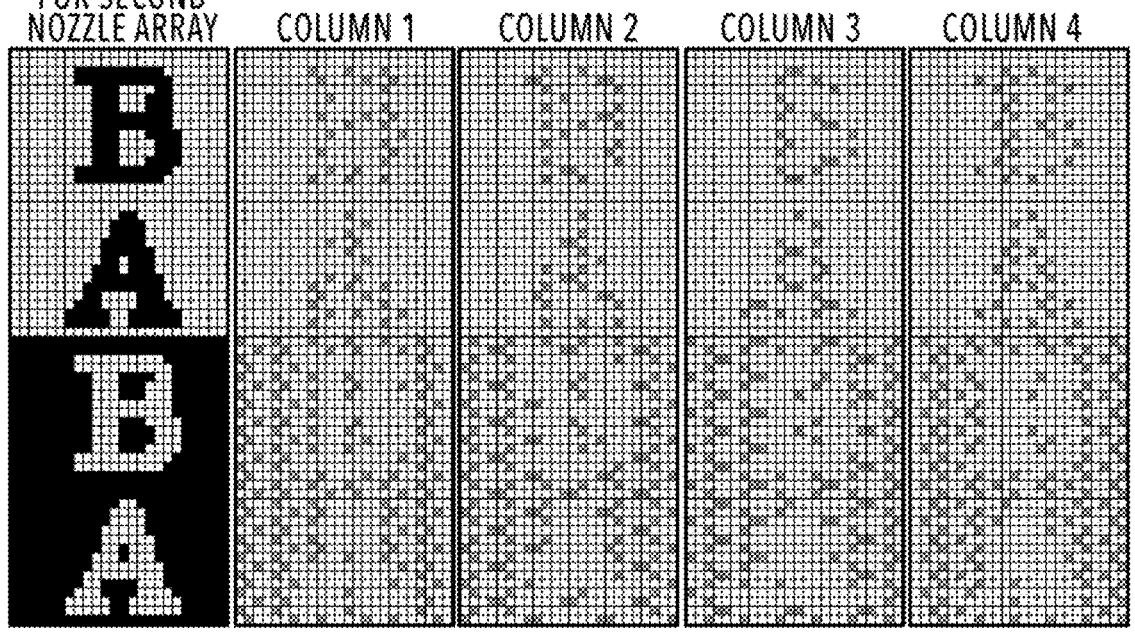
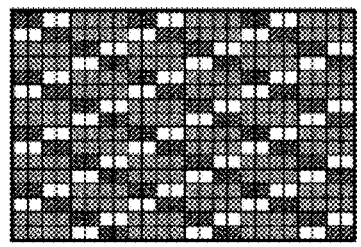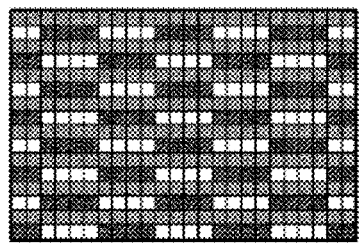
FIG.17B

IMAGE PROCESSING APPARATUS, IMAGE PROCESSING METHOD, AND INKJET PRINTING APPARATUS

The present application is a continuation of U.S. application Ser. No. 16/214,880, filed on Dec. 10, 2018, the entire disclosure of which is incorporated by reference herein.

BACKGROUND OF THE INVENTION

Field of the Invention

The present invention relates to image processing for inkjet printing apparatuses that print an images by forming dots on a print medium.

Description of the Related Art

For serial inkjet printing apparatuses, variation in ejection characteristics of each nozzle may be recognized as the unevenness of density on the image. As a measure against such unevenness of density, for example, there is known a multi-pass printing method. In the multi-pass printing, the same image area on a print medium is printed by multiple printing scans while a conveyance operation is performed by a distance shorter than the print width of the print head between the printing scans. As a result, a line extending in the main scanning direction is made up of the array of dots printed with multiple nozzles alternately, which can reduce the unevenness of density resulting from the variation in print characteristics of each nozzle.

Meanwhile, for such multi-pass printing, column thinning can be used together. The column thinning is a method in which pixel rows (columns) aligned in the main scanning direction are classified into, for example, odd columns and even columns, and a printing scan for printing only the odd columns and a printing scan for printing the even columns are performed alternately. Use of the column thinning makes is possible to increase the scan speed of the print head while the drive frequency of each nozzle is kept constant because the ejection cycle of each nozzle can be set as the interval of every other columns. As a result, the column thinning makes the printing time shorter than ordinary multi-pass printing. Japanese Patent Laid-Open Nos. 2002-29097 and 2004-1560 disclose multi-pass printing methods using column thinning together.

Meanwhile, Japanese Patent Laid-Open No. H10-109442 (1998) discloses a method in which multiple nozzle arrays configured to eject the same kind of ink are prepared, and an image that can be printed by one nozzle array in one printing scan is shared by multiple nozzle arrays for printing. Use of the technique disclosed in Japanese Patent Laid-Open No. H10-109442(1998) also reduces the unevenness of density resulting from the variation in ejection characteristics of each nozzle for the same reason as for multi-pass printing. In addition, multi-pass printing with a technique disclosed in Japanese Patent Laid-Open No. H10-109442(1998) further improves the image quality. Further, Japanese Patent No. 6131216 discloses a quantization method for reducing the unevenness of lightness that appears at regular intervals when the technique in Japanese Patent Laid-Open No. H10-109442(1998) is used.

As described above, recent serial inkjet printing apparatuses are aimed at reducing the unevenness of density resulting from the variation in print characteristics of each nozzle by, for example, employing column thinning and a multi-pass printing method or preparing multiple nozzle arrays capable of ejecting the same kind of ink.

Unfortunately, in the case of performing multi-pass printing and column thinning using multiple nozzle arrays as in Japanese Patent Laid-Open No. H10-109442(1998), print position errors between the nozzle arrays in the conveyance direction may be a new problem besides the variation in ejection characteristics of each nozzle. In the case where such a print position error is relatively large; even if the technique disclosed in Japanese Patent No. 6131216 is used, images printed with different nozzle arrays do not complement each other in a preferable condition in some cases, causing recognizable unevenness at regular intervals in the conveyance direction.

SUMMARY OF THE INVENTION

The present invention has been made to solve the above problems. Thus, an object of the present invention is to make it possible for an inkjet printing apparatus that performs multi-pass printing and column thinning using multiple nozzle arrays configured to eject ink of the same color, to print uniform images without unevenness even if a print position error occurs between the nozzle arrays.

According to a first aspect of the present invention, there is provided an image processing apparatus generating ejection data for printing an image in a unit area of the print medium by repeating a printing scan and a conveyance operation alternately, the printing scan being an operation of using a first nozzle array and a second nozzle array each having a predetermined number of nozzles arrayed in a predetermined direction, each nozzle configured to eject the same kind of ink, and scanning the first nozzle array and the second nozzle array in a direction intersecting the predetermined direction while causing each nozzle to eject the ink toward the print medium, the conveyance operation being an operation of conveying the print medium by a distance corresponding to each of M print regions obtained by dividing the predetermined number of the nozzles into M regions, M being an integer of four or more, in a direction intersecting the direction of the printing scan, the image in the unit area of the print medium being printed by M printing scans, wherein each of N pieces of column data obtained by thinning binary dot data in every N-th column, N being an integer between four and M inclusive, is printed by a different scan of the printing scan, the image processing apparatus comprising an ejection data generation unit that generates ejection data for the first nozzle array for each of the N pieces of column data using a first mask pattern that defines, in advance, print-permitted pixels at which dot-printing is permitted and print-not-permitted pixels at which dot-printing is not permitted, and generates ejection data for the second nozzle array for each of the N pieces of column data using a second mask pattern different from the first mask pattern, wherein (i) the first mask pattern and the second mask pattern have a complementary relationship in each of the M print regions, and (ii) in each of the first mask pattern and the second mask pattern, a combination of print regions, of the M print regions, for printing dots at the same position on the print medium has a mutually complementary relationship.

According to a second aspect of the present invention, there is provided an image processing method of generating ejection data for printing an image in a unit area of the print medium by repeating a printing scan and a conveyance operation alternately, the printing scan being an operation of using a first nozzle array and a second nozzle array each having a predetermined number of nozzles arrayed in a predetermined direction, each nozzle configured to eject the same kind of ink, and scanning the first nozzle array and the second nozzle array in a direction intersecting the predetermined direction while causing each nozzle to eject the ink toward the print medium, the conveyance operation being an operation of conveying the print medium by a distance corresponding to each of M print regions obtained by dividing the predetermined number of the nozzles into M regions, M being an integer of four or more, in a direction intersecting the direction of the printing scan, the image in the unit area of the print medium being printed by M printing scans wherein each of N pieces of column data obtained by thinning binary dot data in every N-th column, N being an integer between four and M inclusive, is printed by a different scan of the printing scan, the image processing method comprising an ejection data generation step of generating ejection data for the first nozzle array for each of the N pieces of column data using a first mask pattern that defines, in advance, print-permitted pixels at which dot-printing is permitted and print-not-permitted pixels at which dot-printing is not permitted, and generating ejection data for the second nozzle array for each of the N pieces of column data using a second mask pattern different from the first mask pattern, wherein (i) the first mask pattern and the second mask pattern have a complementary relationship in each of the M print regions, and (ii) in each of the first mask pattern and the second mask pattern, a combination of print regions, of the M print regions, for printing dots at the same position on the print medium has a mutually complementary relationship.

According to a third aspect of the present invention, there is provided an An inkjet printing apparatus comprising: a first nozzle array and a second nozzle array each having a predetermined number of nozzles arrayed in a predetermined direction, each nozzle configured to eject the same kind of ink; a print unit that causes the first nozzle array and the second nozzle array to perform a printing scan in a direction intersecting the predetermined direction while causing each nozzle to eject the ink toward a print medium; and a conveyance unit that conveys the print medium by a distance corresponding to each of M print regions obtained by dividing the predetermined number of the nozzles into M regions, M being an integer of four or more, in a conveyance direction intersecting the direction of the printing scan, wherein an image in a unit area of the print medium is printed by the M printing scans, when the printing scan and a conveyance operation by the conveyance unit are repeated alternately, and each of N pieces of column data obtained by thinning binary dot data in every N-th column, N being an integer between four and M inclusive, is printed by a different scan of the printing scan, the inkjet printing apparatus further comprising an ejection data generation unit that generates ejection data for the first nozzle array for each of the N pieces of column data using a first mask pattern that defines, in advance, print-permitted pixels at which dot-printing is permitted and print-not-permitted pixels at which dot-printing is not permitted, and generates ejection data for the second nozzle array for each of the N pieces of column data using a second mask pattern different from the first mask pattern, wherein (i) the first mask pattern and the second mask pattern have a complementary relationship in each of the M print regions, and, (ii) in each of the first mask pattern and the second mask pattern, a combination of print regions, of the M print regions, for printing dots at the same position on the print medium has a mutually complementary relationship.

Further features of the present invention will become apparent from the following description of exemplary embodiments with reference to the attached drawings.

BRIEF DESCRIPTION OF THE DRAWINGS

FIGS. 4A and 4B are diagrams illustrating an example of dot-arrangement patterns and the states of printed dots;

FIGS. 10A and 10B are diagrams illustrating the results of logical AND operations performed between column data and mask patterns;

FIGS. 11A and 11B are diagrams illustrating an example of dot-arrangement patterns and the states of printed dots;

FIGS. 13A and 13B are diagrams illustrating the results of logical AND operations performed between column data and mask patterns;

FIGS. 17A and 17B are diagrams illustrating the results of logical AND operations performed between column data and mask patterns.

DESCRIPTION OF THE EMBODIMENTS

First Embodiment

Figure 1A:
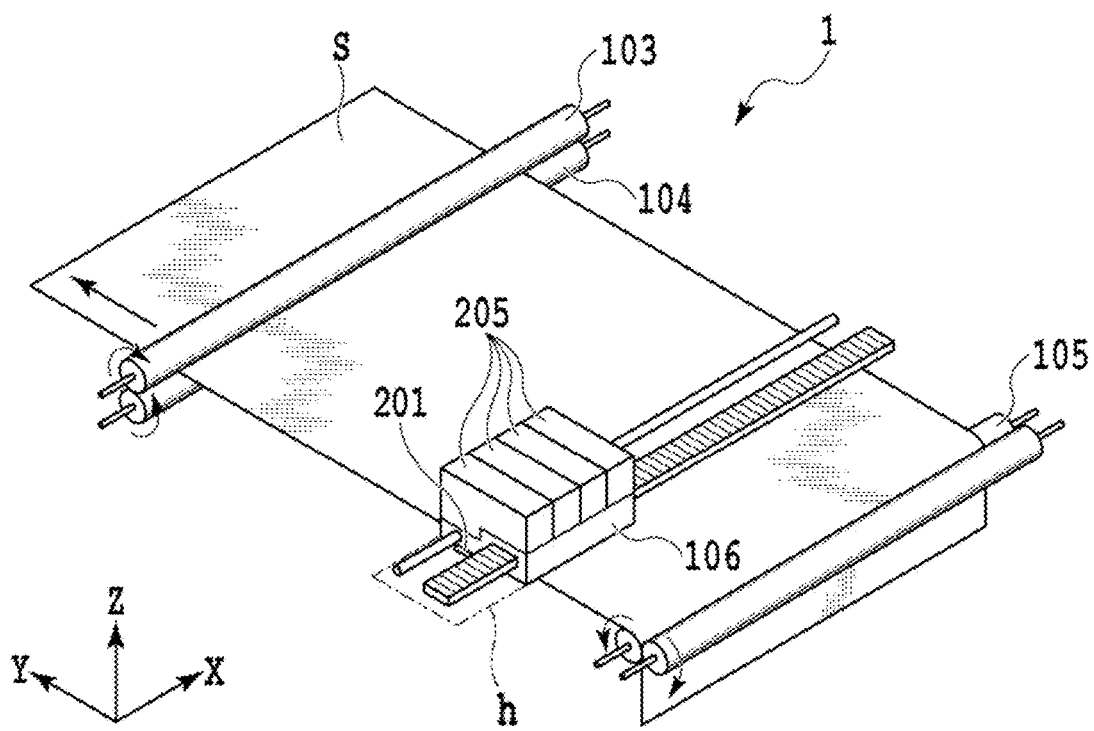
FIGS. 1A and 1B are diagrams illustrating the configuration of the printing part of a color inkjet printing apparatus.
Figure 1B:
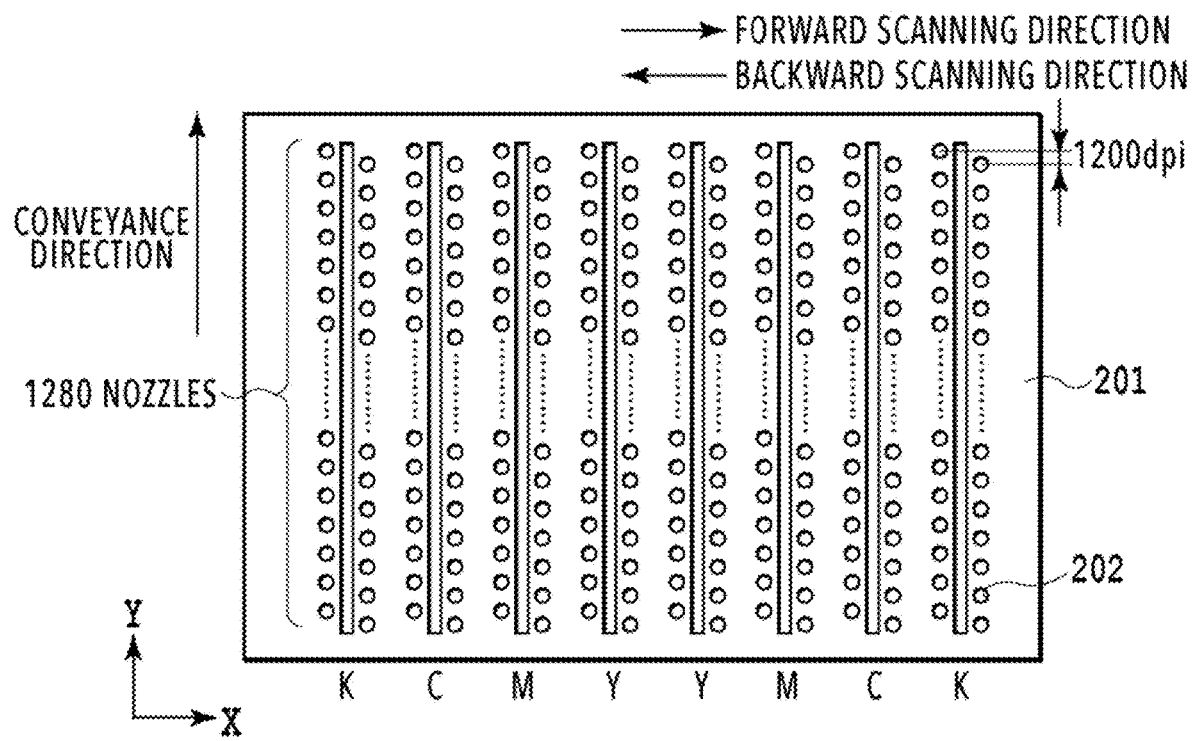

FIGS. 1A and 1B are diagrams illustrating the configuration of a printing part of a color inkjet printing apparatus 1 applicable to the present invention. FIG. 1A is a perspective view of the printing part, and FIG. 1B is an arrangement structure diagram of nozzles 202 on a print head 201.

As illustrated in FIG. 1A, a print medium S is held between two pairs of rollers, which are a pair of feed rollers 105 and a pair of rollers formed by a conveyance roller 104 and an auxiliary roller 103, and is kept flat and smooth. The pair of feed rollers 105 and the conveyance roller 104 rotate while supporting the print medium S to convey it in the Y direction.

Between these two pairs of rollers is disposed a carriage 106 capable of reciprocating in the X direction, and on the carriage 106 are mounted ink tanks 205 and the print head

201. The ink tanks 205, containing four colors of inks (black K, cyan C, magenta M, and yellow Y) separately, are connected to the print head 201 in the state of being mounted on the carriage 106 and supply these inks to the print head 201.

As illustrated in FIG. 1B, the print head 201 has eight rows of nozzle arrays, every two rows corresponding to each of the four inks, and in each row, 1280 nozzles are aligned at a pitch of 1200 dpi in the Y direction. Each nozzle 202 ejects approximately 4 pl of ink toward the print medium S according to ejection data.

In this embodiment, the nozzle arrays are arranged in the order of black, cyan, magenta, yellow, yellow, magenta, cyan, and black from the left. With this order, the application order of the inks is the same on the print medium between during printing scans in the forward direction (+X direction) and during printing scans in the backward direction (−X direction), reducing color unevenness resulting from the application order of the inks. Note that, this embodiment is not limited to the number of nozzle arrays and the order of the arrangement described above. There only needs to be two or more rows of nozzle arrays that have a certain number of nozzles in a certain direction and eject the same kind of ink.

With the configuration described above, while the carriage 106 is scanning in the forward direction or the backward direction at a certain speed, the print head 201 ejects ink according to the ejection data, so that one band of an image is printed on the print medium S. By intermittently repeating the printing scan (relative scanning) for one band as described above and a conveyance operation of the print medium S in the direction intersecting the direction of the printing scan, the image is gradually formed on the print medium S.

While waiting for a print command, or during a maintenance process of the print head 201, the carriage 106 is positioned and waits at the home position h indicated by the dotted lines in the figure. Note that in the above example, the ink tanks 205 and the print head 201 can be individually detached from the carriage 106; however, the ink tanks 205 and the print head 201 may be integrated as a cartridge.

Figure 2:
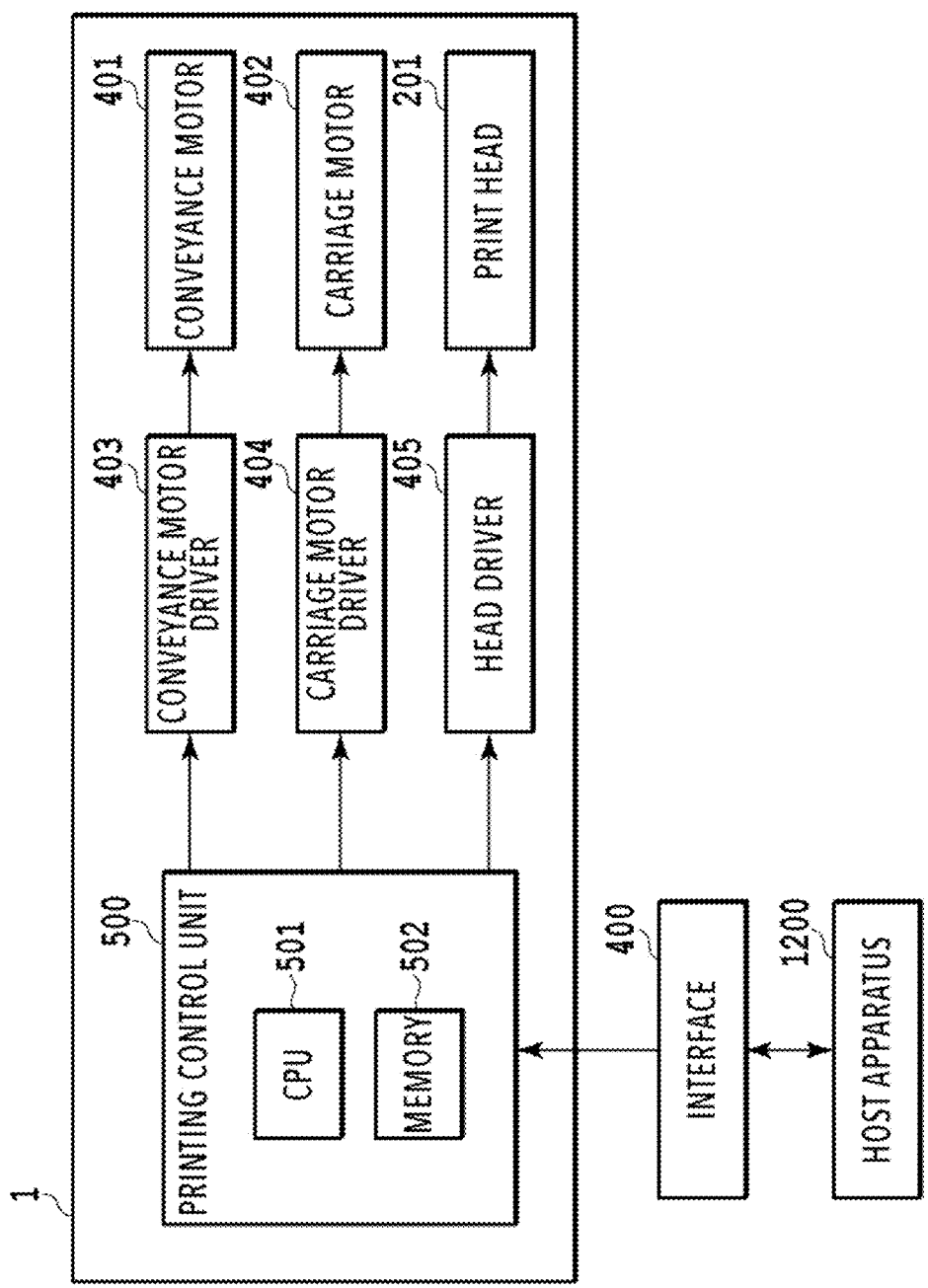
FIG. 2 is a block diagram illustrating the configuration of control in the inkjet printing apparatus.

FIG. 2 is a block diagram illustrating the configuration of control in the inkjet printing apparatus 1. A print control unit 500 mainly includes a CPU 501 that serves as a calculation unit and a memory 502 and controls the entire apparatus according to various programs and parameters stored in the memory 502. The memory 502 also stores mask patterns and dot-arrangement patterns for performing the characteristic process of the present invention.

A conveyance motor driver 403 drives a conveyance motor 401 for rotating the conveyance roller 104 and the feed rollers 105 under instructions from the print control unit 500. A carriage motor driver 404 drives a carriage motor 402 for moving the carriage 106 under instructions from the print control unit 500. A head driver 405 drives the print head 201 to make it perform ejection operation under instructions from the print control unit 500.

For example, the print control unit 500 performs a specified image processing on image data received from a host PC 1200 via an interface 400, according to a program stored in the memory 502. With this process, the ejection data (dot data) that can be printed by the print head 201 is generated. Then, the print control unit 500 sequentially calls the ejection data temporarily stored, based on a program stored in the memory 502 while driving the various drivers to execute printing.

Figure 3:
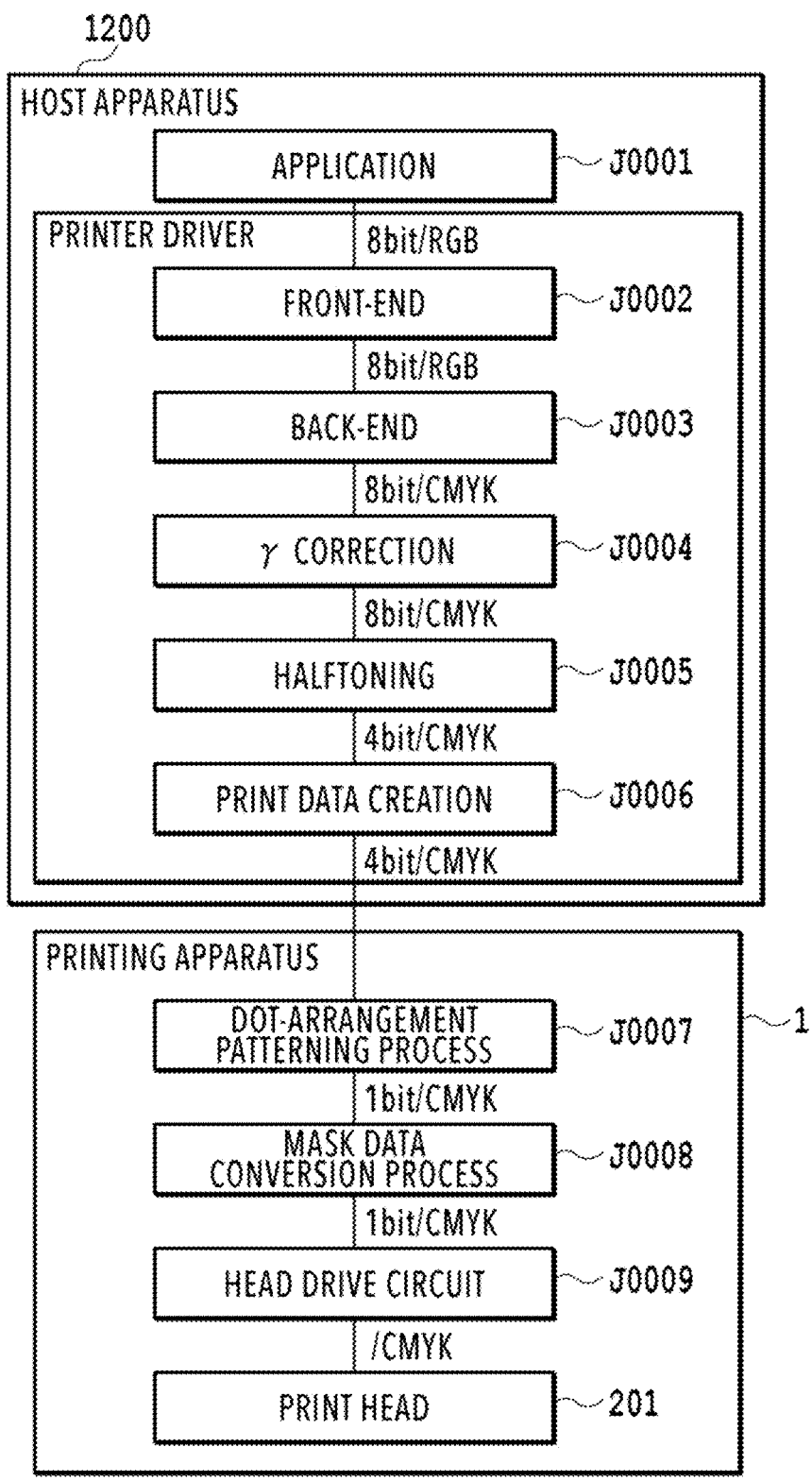
FIG. 3 is a block diagram for explaining a conversion step of image data.

FIG. 3 is a block diagram for explaining a conversion step for image data executed by each of the host apparatus 1200 and the printing apparatus 1. The programs running on the operating system of the host apparatus 1200 include applications and printer drivers. In this example, it is assumed that the application J0001 generates 8-bit RGB data having a resolution of 600 ppi. When a print job occurs, 600 ppi 8-bit RGB data generated by the application J0001 is provided to the printer driver.

The printer driver in this embodiment executes, as its process, a front-end process J0002, back-end process J0003, γ correction process J0004, halftoning J0005, and print data creation process J0006. Hereinafter, each process will be briefly described.

The front-end process J0002 performs mapping of the color gamut (Gamut). In other words, data conversion is performed to map the color gamut reproducible by RGB data conforming to sRGB standard, received by the application J0001, within the color gamut reproducible by the printing apparatus 1. Specifically, a three-dimensional look-up table (LUT) is used to convert 8-bit RGB data into 8-bit R'G'B' data having different contents.

The back-end process J0003 performs data conversion so that the colors represented by the 8-bit R'G'B' data outputted from the front-end process J0002 can be expressed by the ink colors (cyan C, magenta M, yellow Y, and black K) used in the printing apparatus. Specifically, a three-dimensional LUT is used to convert the 8-bit R'G'B' data into 8-bit CMYK data.

Note that the look-up tables used in the front-end process J0002 and the back-end process J0003 do not need to have output signal values prepared for all the combinations of input signal values. Only the relationships between input signals and output signals at specified lattice points may be stored, and for input signal values other than those of the lattice points, the output signal values may be calculated also using interpolation operations.

The γ correction process J0004 performs a correction process so that the image density expressed on the print medium has linearity to the input signal (tone signal). Specifically, by referring to a one-dimensional look-up table prepared for each ink color, the γ correction process J0004 converts 8-bit data (CMYK) for each ink color into 8-bit data (C'M'Y'K') for each of the same ink colors. The processes after the γ correction process J0004, explained below, are performed individually for each ink color.

The halftoning J0005 performs a quantization process of converting 8-bit data representing 256 tones into 4-bit data representing 9 tones. Although this embodiment uses multilevel error diffusion processing, a dither method or the like may be used for this process. This 4-bit data serves as indexes for indicating the dot-arrangement patterns at a dot-arrangement patterning process J0007 described later.

In the print data creation process J0006, the 4-bit data for each color of each pixel at a resolution of 600 ppi, generated through the processes described above, is organized for all the pixels included in the print job, and print data to which print control information specifying the printing method is added is created. The print data is transferred to the printing apparatus 1.

When receiving the print data, the print control unit 500 of the printing apparatus 1 performs the dot-arrangement patterning process J0007 and a mask data conversion process J0008 in order, based on the contents of the print data. Data that can be handled by the print head 201 in this embodiment is binary data indicating dot-printing (1) or no dot-printing (0) for each of the 1200 dpi pixels. For this reason, the dot-arrangement patterning process J0007 serves as a dot-data generation unit for generating binary dot data by converting 4-bit data indicating 9 tones of each of the 600 ppi pixels into binary data of 1200 dpi indicating dot-printing (1) and no dot-printing (0).

FIGS. 4A and 4B are diagrams illustrating examples of dot-arrangement patterns that the dot-arrangement patterning process J0007 refers to and the states of dots printed on the print medium, corresponding to these patterns. In FIG. 4A, the levels shown on the left indicate tone level values (0 to 8) indicated by 4-bit data of each of the 600 ppi pixels. The patterns of length 2×width 4 shown on the right side of the levels are dot-arrangement patterns for expressing the tones indicated by the corresponding levels, by selecting dot-printing or no dot-printing for each of the 1200 dpi pixels. For level 0, no dot is printed in any area of the length 2×width 4, and the number of printed dots increases by one for every level increase.

In the dot-arrangement pattern, each cell corresponds to one of the 1200 dpi×1200 dpi pixels, and a set of 2×4 cells corresponds to one of the 600 ppi pixels. In this embodiment, the columns (lines) in each dot-arrangement pattern are called the first column, the second column, the third column, and the fourth column from the leftmost column (line), and the different columns are printed during different printing scans. Then, when dots are actually printed on the print medium, the dots of the third column are printed at the same positions as those of the first column, and the dots of the fourth column are printed at the same positions as those of the second column. In other words, on the print medium, the set of the left 2×2 pixels and the set of the right 2×2 pixels of the 2×4 pixels are printed with one on top of the other.

FIG. 4B illustrates the states of dots printed with the set of the left 2×2 pixels and the set of the right 2×2 pixels overlaid with one on top of the other based on the dot-arrangement patterns illustrated in FIG. 4A. The symbol "⊙" represents a pixel at which two dots are printed with one on top of the other, the symbol "○" represents a pixel at which one dot is printed, and a blank cell represents a pixel at which no dot is printed.

In this embodiment, as illustrated in FIG. 4A, four dot-arrangement patterns (4n) to (4n+3) are prepared for each level and used in order in the main scanning direction and the sub scanning direction. With this setting, on the print medium, four kinds of dot-printed states illustrated in FIG. 4B are to be positioned in order in the main scanning direction and the sub scanning direction. Preparing multiple dot-arrangement patterns having different dot layouts for the same level value in this way disperses the ejection frequency of each nozzle, making the image on the print medium smooth, when the image has a uniform tone in which the same level value continues.

FIG. 3 is referred to again. The 1200 dpi dot data generated at the dot-arrangement patterning process J0007 is passed to the mask data conversion process J0008. The mask data conversion process J0008 allocates this dot data to multiple printing scans using mask patterns prepared in advance and generates data for each nozzle array to eject ink in each printing scan, and thus, the mask data conversion process J0008 serves as an ejection data generation unit. Specifically, for each of the 1200 dpi pixels, the mask data conversion process J0008 performs logical AND operations between 1-bit data received from the dot-arrangement patterning process J0007 and 1-bit data defined by the mask pattern to determine the nozzle and printing scan for printing each piece of the dot data.

Figure 5:
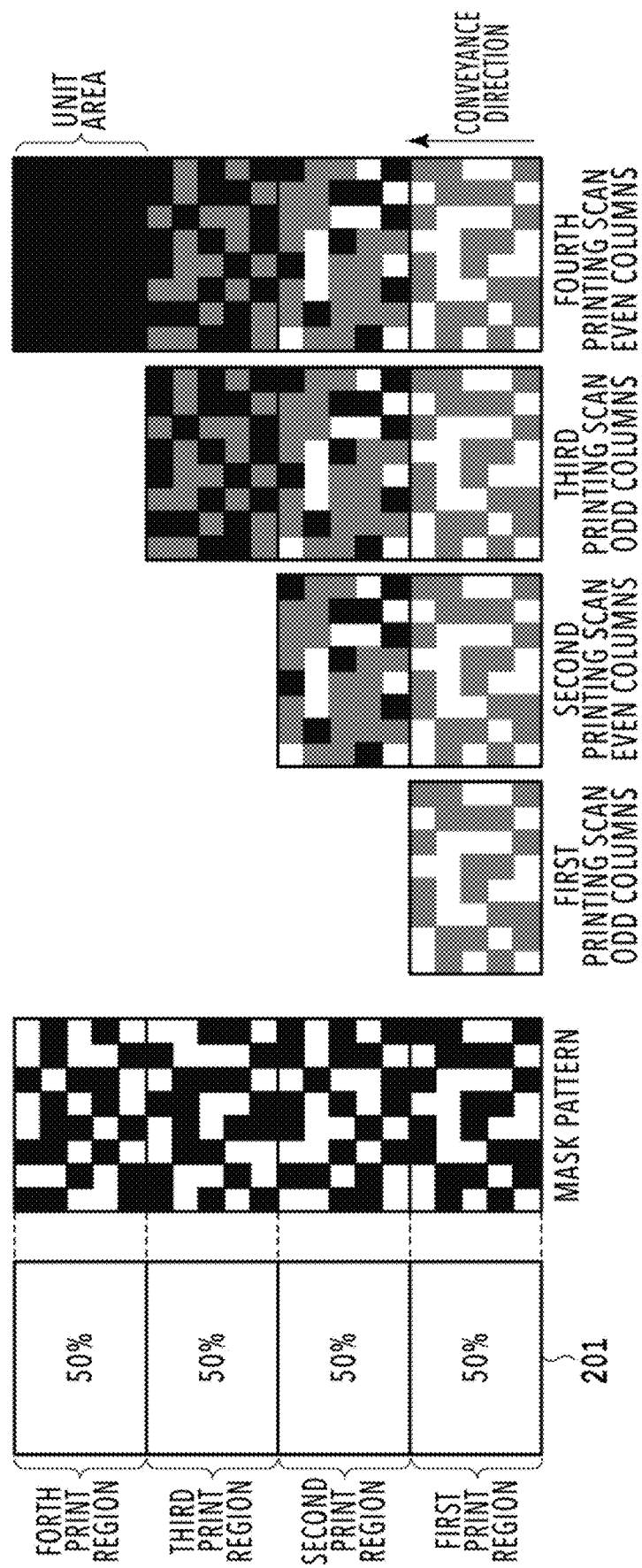
FIG. 5 is a diagram for explaining mask patterns and the print states.

FIG. 5 is a diagram for explaining an example of the mask pattern and the print state in the case of using the mask pattern. The mask pattern defines print-permitted pixels at which printing is permitted and print-not-permitted pixels at which printing is not permitted, and in the figures, the print-permitted pixels are indicated by black, and the print-not-permitted pixels are indicated by white. Here, description is provided for the case of performing 4-pass multi-pass printing with 2-column thinning.

In the case of 2-column thinning, the print head 201 alternately performs a printing scan for printing odd columns in the dot-arrangement pattern and a printing scan for printing even columns. In the case of 4-pass multi-pass printing, the nozzle arrays of the print head are equally divided into four regions, and every time one printing scan of the print head is performed, the print medium is conveyed in the conveyance direction by the distance corresponding to each region. In other words, in the case of performing 4-pass multi-pass printing with 2-column thinning, an image in a unit area on the print medium is completed by two printing scans for odd columns and two printing scans for even columns.

The mask pattern for such a case is formed, as illustrated in FIG. 5, such that the first print region and the third print region, which print identical columns, have a mutually complementary relationship, and the second print region and the fourth print region, which print the other identical columns, have a mutually complementary relationship. Although in FIG. 5, the ratio of print-permitted pixels (print permission rate) of each print region is 50% so that the mutual complementation makes the print permission rate 100%, the print permission rate of each print area does not have to be equal as long as the above 100% complementation relationship is kept.

The right side of the mask patterns in FIG. 5 illustrates a state where an image is being formed in a unit area along with printing scans. Here, the illustration is provided for the case where all of the 600 ppi pixels are at level 8, and two dots are printed at each of the 1200 dpi pixels (see FIGS. 4A and 4B). White indicates pixels with no dot printed; gray, pixels with one dot printed; and black, pixels with two dots printed.

In the memory 502, multiple binary mask patterns each defining dot print-permitted pixels and print-not-permitted pixels as described above are stored in advance being associated with print modes and ink colors. The mask data conversion process J0008 reads one piece of the mask data from the memory 502 based on information indicated by the print control information and performs logical AND operations between the one piece of the mask data and binary dot data generated in the dot-arrangement patterning process J0007. The 1-bit data thus obtained, which is dot data to be actually printed in each printing scan, is transmitted to a head drive circuit J0009.

The head drive circuit J0009 applies drive pulses to the print head 201 to cause each nozzle to perform ejection operation according to the 1-bit data obtained from the mask data conversion process J0008, Hereinafter, description will be provided for characteristic mask patterns of the present invention in detail. To explain general functions of the mask patterns, FIG. 5 illustrates an example in which the image in a unit area is printed by 4-pass multi-pass printing of one nozzle array with 2-column thinning. In this embodiment, using two nozzle arrays, the first nozzle array and the second nozzle array, which eject ink of the same color, 4-pass multi-pass printing with 4-column thinning is performed.

Figure 6:
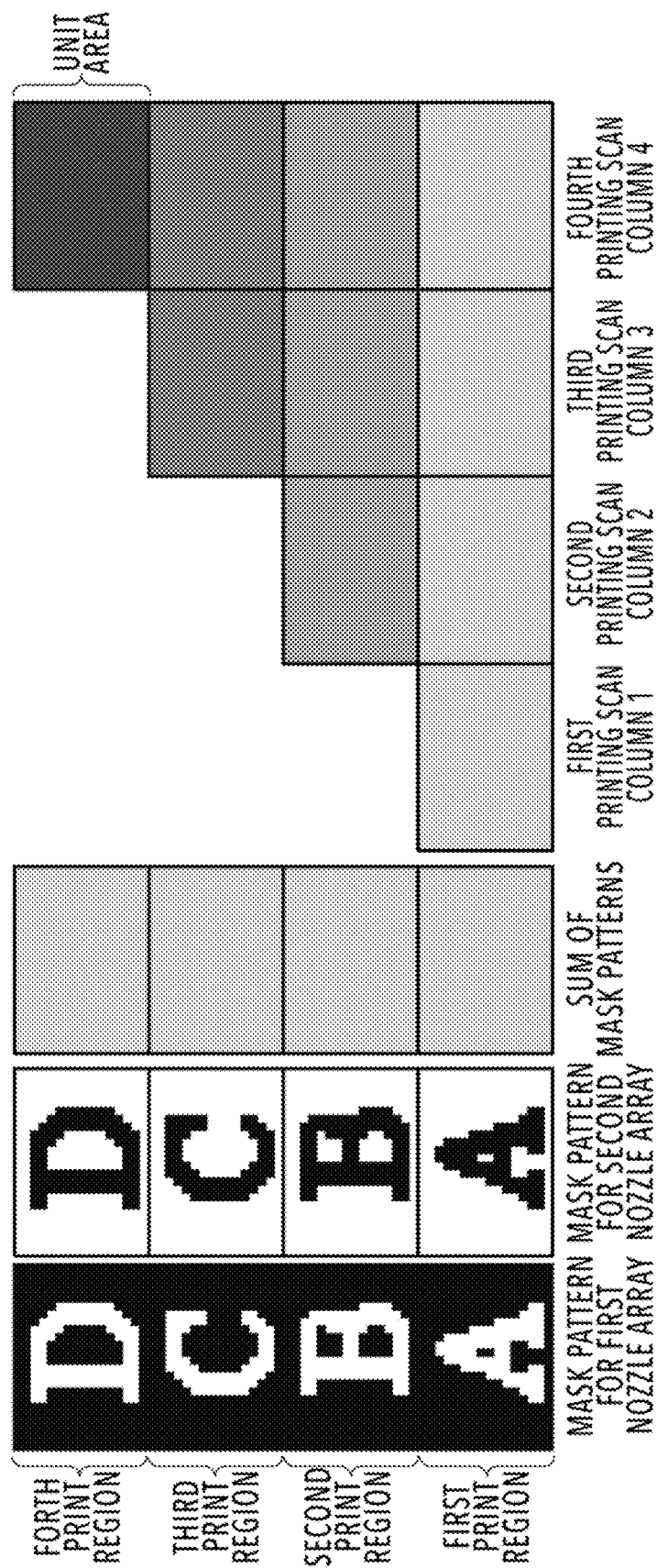
FIG. 6 is a diagram illustrating an example of mask patterns for two nozzle arrays and the print states.

FIG. 6 is a diagram illustrating mask patterns that can be used in the case of performing 4-pass multi-pass printing with 4-column thinning using two nozzle arrays, the first nozzle array and the second nozzle array, which eject ink of the same color, and also illustrates the print state in this case. In the case of 4-column thinning, the print head performs in order, scanning for printing the first column, scanning for printing the second column, scanning for printing the third column, and scanning for printing the fourth column. In the case of 4-pass multi-pass printing, the nozzle array area of the print head is divided into four regions, the first to fourth regions, and every time one printing scan of the print head is performed, the print medium is conveyed in the conveyance direction by the distance corresponding to each print region. In other words, in the case of performing 4-pass multi-pass printing with 4-column thinning, the image in a unit area of the print medium is completed by a printing scan for the first column, a printing scan for the second column, a printing scan for the third column, and a printing scan for the fourth column using the first and second nozzle arrays.

In this case, the mask patterns used by the first and second nozzle arrays which print the same columns in the same printing scan have a complementary relationship in each of the first, second, third, and fourth print regions. In other words, the print permission rate of each print region is 100%, and thus, one dot is printed at each of all the pixels of the corresponding columns in each printing scan with either the first or second nozzle array. FIG. 6 illustrates, as an example, mask patterns in which print-permitted pixels and print-not-permitted pixels are arranged such that these pixels depict inverted characters (A, B, C, and D), to make it easy to understand the complementary relationship.

The right side in FIG. 6 illustrates a state where an image is being formed in a unit area along with printing scans. The image in the unit area is completed by the image of every fourth column being printed in order in four printing scans.

Figure 7:
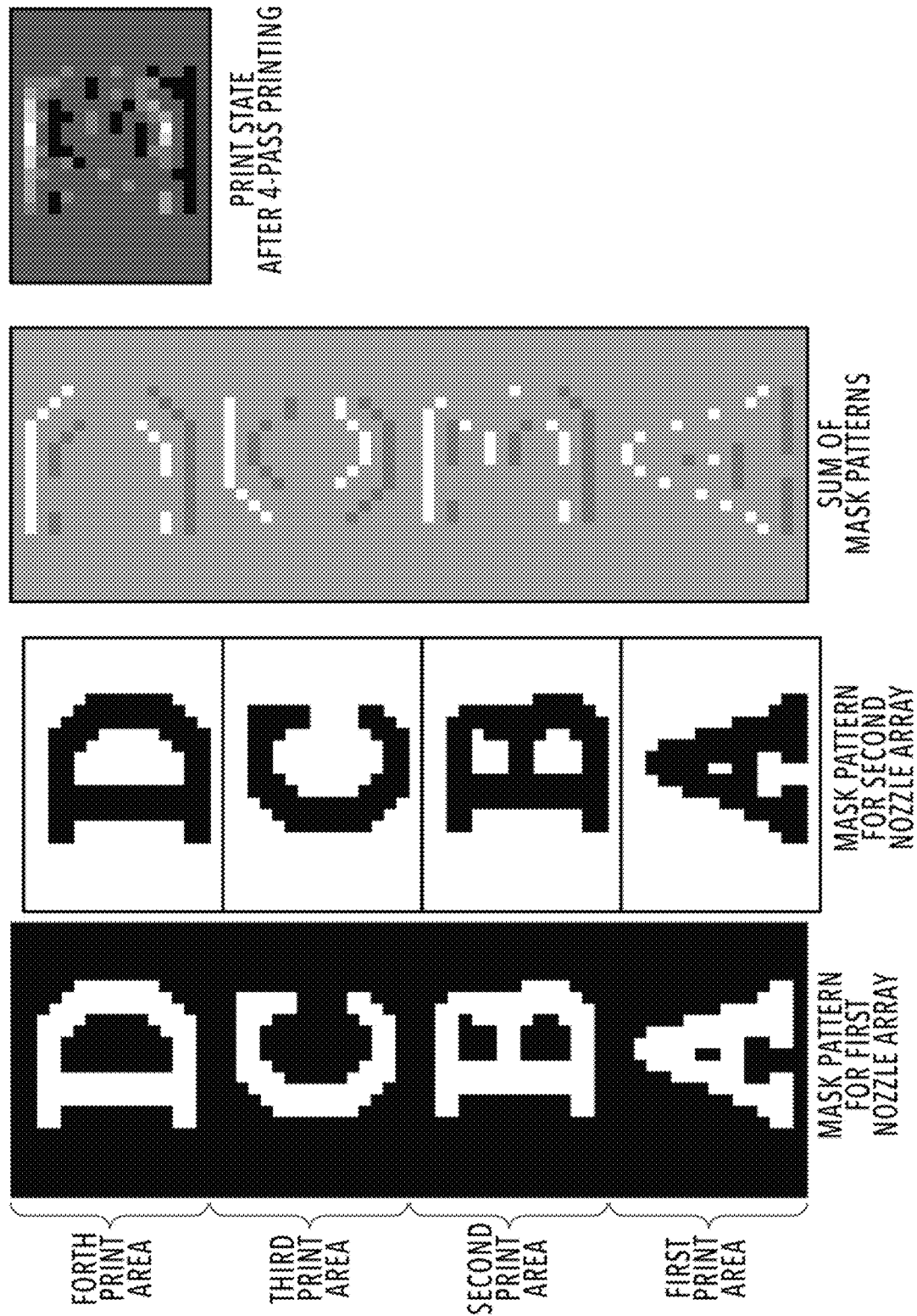
FIG. 7 is a diagram illustrating an image printed when the print positions of the nozzle arrays have a positional error.

FIG. 7 illustrates an image printed using the mask patterns illustrated in FIG. 6 in the case where the print position of the first nozzle array and the print position of the second nozzle array have a positional error by the distance corresponding to one pixel in the conveyance direction. The complementary relationship between the first and second nozzle arrays is lost in each of the first, second, third, and fourth print regions, and pixels where dots are printed with both the first and second nozzle arrays and pixels where a dot is not printed with either nozzle array are included mixedly. Then, also in the completed image created by overlaying such four regions on top of each other, the number of overlaid dots is unbalanced among the pixels along with the positional error of the mask patterns, degrading the uniformity of the image.

Figure 8:
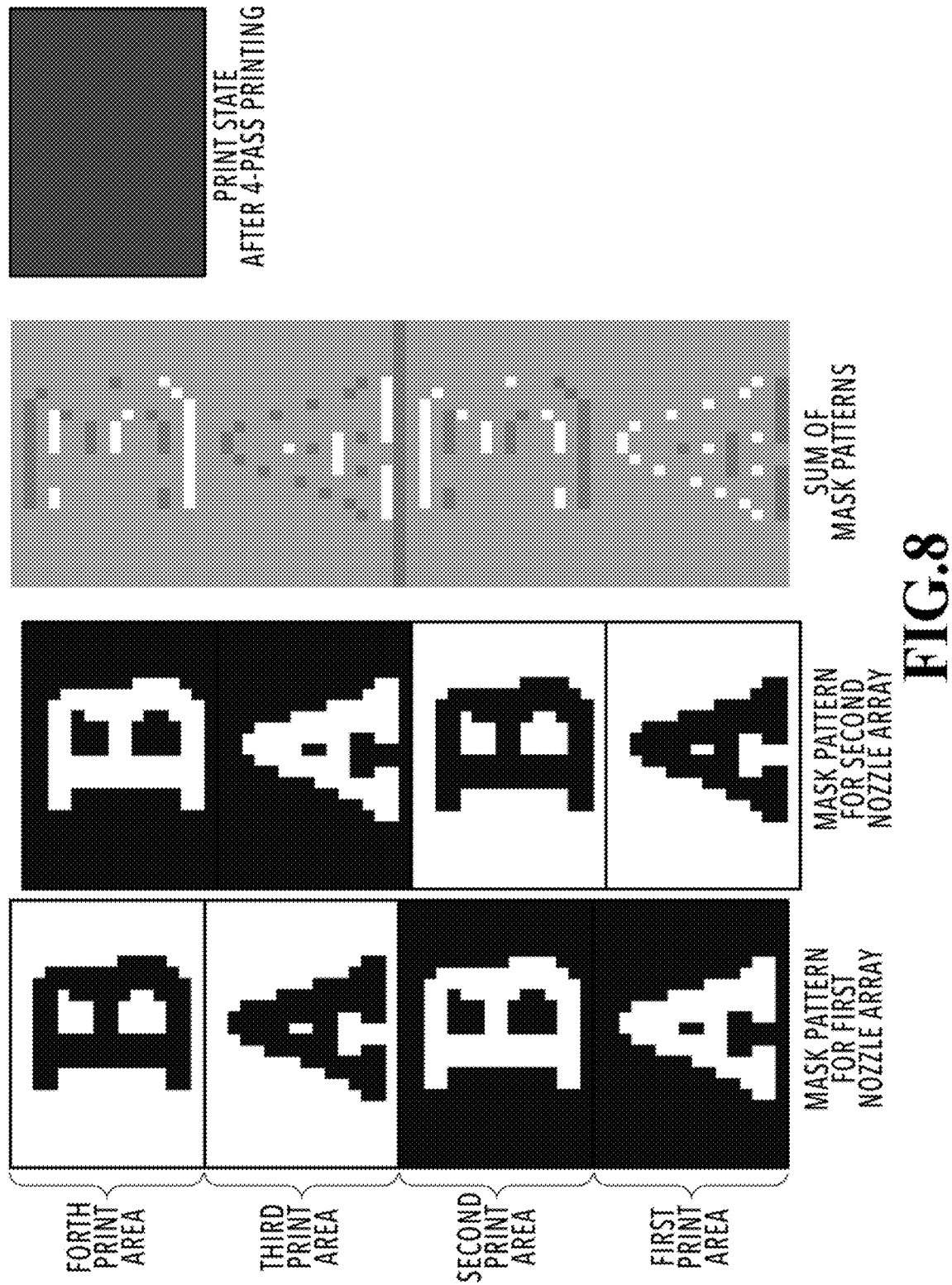
FIG. 8 is a diagram illustrating an image printed when the print positions of the nozzle arrays have a positional error.

FIG. 8 is a diagram illustrating a print state in the case of replacing the mask patterns with characteristic mask patterns of this embodiment, under the same conditions as in FIG. 7. A first condition for forming mask patterns of this embodiment is that mask patterns used by the first and second nozzle arrays which print the same columns in the same printing scan have a complementary relationship in all the print areas. This condition is satisfied also by the mask patterns illustrated in FIGS. 6 and 7. A second condition is that mask patterns have a complementary relationship in the combination of the first and third print regions which are different columns on the data but are for printing dots at the same positions on a print medium and in the combination of the second and fourth print regions which are also different columns on the data but are for printing dots at the same positions on the print medium.

Specific description will be provided with reference to FIG. 8. The mask pattern (white hollow character A) of the first print region for the first nozzle array has a complementary relationship with the mask pattern (black solid character A) of the first print area for the second nozzle array (condition 1), and also has a complementary relationship with the mask pattern (black solid character A) of the third print region for the first nozzle array (condition 2). The mask pattern (white hollow character B) of the second print region for the first nozzle array has a complementary relationship with the mask pattern (black solid character B) of the second print region for the second nozzle array (condition 1), and also has a complementary relationship with the mask pattern (black solid character B) of the fourth print region for the first nozzle array (condition 2).

In the case of using the mask patterns described above; if a print position error occurs between the first nozzle array and the second nozzle array, the complementary relationship between the first nozzle array and the second nozzle array in each printing scan is lost as in FIG. 7. However, the complementary relationship between the first print region (white hollow character A) and the third print region (black solid character A) for the same unit area is kept, and the complementary relationship between the second print region (white hollow character B) and the fourth print region (black solid character B) for the same unit area is also kept. Consequently, when the four print regions are overlaid on top of each other, the number of overlaid dots is uniformly two for each among all of the 1200 dpi pixels, providing a uniform image.

In other words, with the mask patterns of this embodiment, a complementary relationship is satisfied among the four print regions for each of the first nozzle array and the second nozzle array. Consequently, even if the print positions of the first nozzle array and the second nozzle array have an error in any direction, an image satisfying the complementary relationship is overlaid on an image satisfying the complementary relationship, and thus preventing deterioration of the uniformity of the image.

Note that in the above, the mask patterns have a complementary relationship in the combination of the first print region and the third print region and in the combination of the second print region and the fourth print region as a combination for printing dots at the same positions on the print medium. However, for 4-column thinning, column scanning does not necessarily have to be performed in order from the left side of the dot-arrangement pattern. For example, after the printing scan of the first column, the printing scan of the third column may be performed, and then, the printing scans of the second column and the fourth column may be performed. In this case, a complementary relationship is given to the mask patterns in each of the combination of the first print region and the second print region and the combination of the third print region and the fourth print region. In any case, if the print regions for printing the first column and the third column which correspond to the same positions on the print medium have a complementary relationship, and the print regions for printing the second column and the fourth column have a complementary relationship, the above effect can be obtained.

However, in the case where multi-pass printing is performed using both directions, even the same nozzle array may cause a print position error in the main scanning direction between in the forward scanning and in the backward scanning. In this case, even if the mask patterns of the adjoining first and second print regions have a complementary relationship; if a positional error occurs in the main scanning direction between these mask patterns, the mutual complementary relationship is lost. Even in this case, for the mask patterns illustrated in FIG. 8, the mask patterns having a complementary relationship can be used in the printing scans in the same direction for the unit area, making less noticeable the influence of the print position error between the forward and backward directions. In other words, use of the mask patterns as illustrated in FIG. 8 makes it possible to print uniform images in which both the influence of the print position error between the nozzle arrays and the influence of the print position error between the forward and backward directions are reduced.

Meanwhile, in the above, the description has been provided for the case where all of the 600 ppi pixels are at level 8, and two dots are printed at all of the 1200 dpi pixels. For a case of another level (tone value), use of mask patterns as illustrated in FIG. 8 may not provide a uniform image. Specific description will be provided below.

Figure 9A:
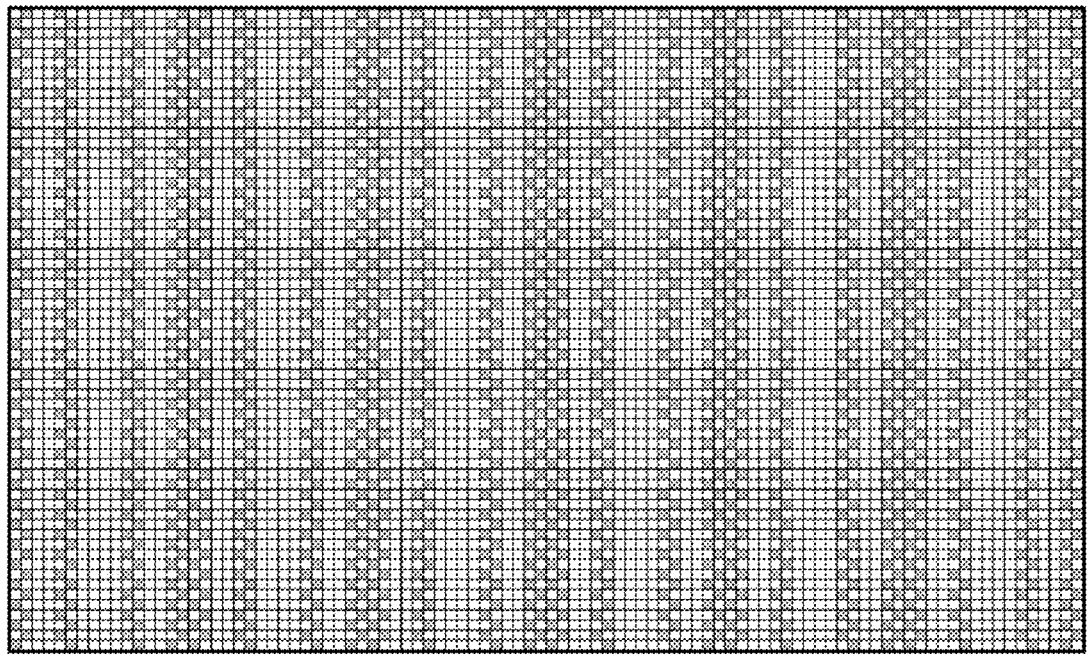
FIG. 9A illustrates a dot pattern.
Figure 9B:
FIG. 9B is a diagram illustrating the state where the dot pattern is divided and distributed to four columns.

FIG. 9A illustrates a dot pattern generated using the dot-arrangement patterns illustrated in FIG. 4 in the case where all of the 600 ppi pixels are at level 2, and FIG. 9B illustrates the state where the dot pattern is divided and distributed to four columns. For example, column 1 illustrated in FIG. 9B has columns coming from every fourth column, such as the first column, the fifth column, the ninth column, and so on, in FIG. 9A, and column 2 has columns coming from every fourth column, such as the second column, the sixth column, the tenth column, and so on, in FIG. 9A. Each of the data of column 1, the data of column 2, the data of column 3, and the data of column 4 illustrated in FIG. 9B is to be printed in the same scanning of the print head.

FIG. 10A illustrates the results of logical AND operations performed between each piece of column data illustrated in FIG. 9B and the mask patterns described with reference to FIG. 8. FIG. 10B illustrates a comparison of the states of images printed by 4-pass multi-pass printing between in the case where a print position error occurs between the first and second nozzle arrays and in the case where no error occurs.

In the case where no print position error occur between the first nozzle array and the second nozzle array, the complementary relationship between the first nozzle array and the second nozzle array is kept in each printing scan, and the image after four printing scans is uniform. However, in the case where a print position error exists between the first nozzle array and the second nozzle array, overlaid images by four printing scans does not provide a uniform image. This is caused because the positions of the two dots in the layout at level 2 are not positions printed at the same position on the print medium. This is because since the positions of the two dots are not positions printed at the same position on the print medium, even if the mask patterns for the first and third columns for printing dots at the same positions on the print medium have a complementary relationship, the effect of the complementary relationship cannot be obtained.

In light of the situation above, the inventors of the present invention has judged that to provide uniform images at any level, it is effective to prepare dot-arrangement patterns in which two dots are printed at the same position as much as possible on a print medium at any level.

FIGS. 11A and 11B are diagrams illustrating dot-arrangement patterns used in this embodiment and the states of printed dots on a print medium, corresponding to these patterns. For example, referring to level 2, two dots are positioned in every other column (such as the first and third columns) of the same raster (upper row or lower row) so that the two dots are printed at the same pixel position on a print medium. In this way, in the dot-arrangement patterns in this embodiment, the dot layout at each level is defined such that as many combinations as possible of dots that are printed at the same pixel positions in a print medium are included.

Figure 12A:
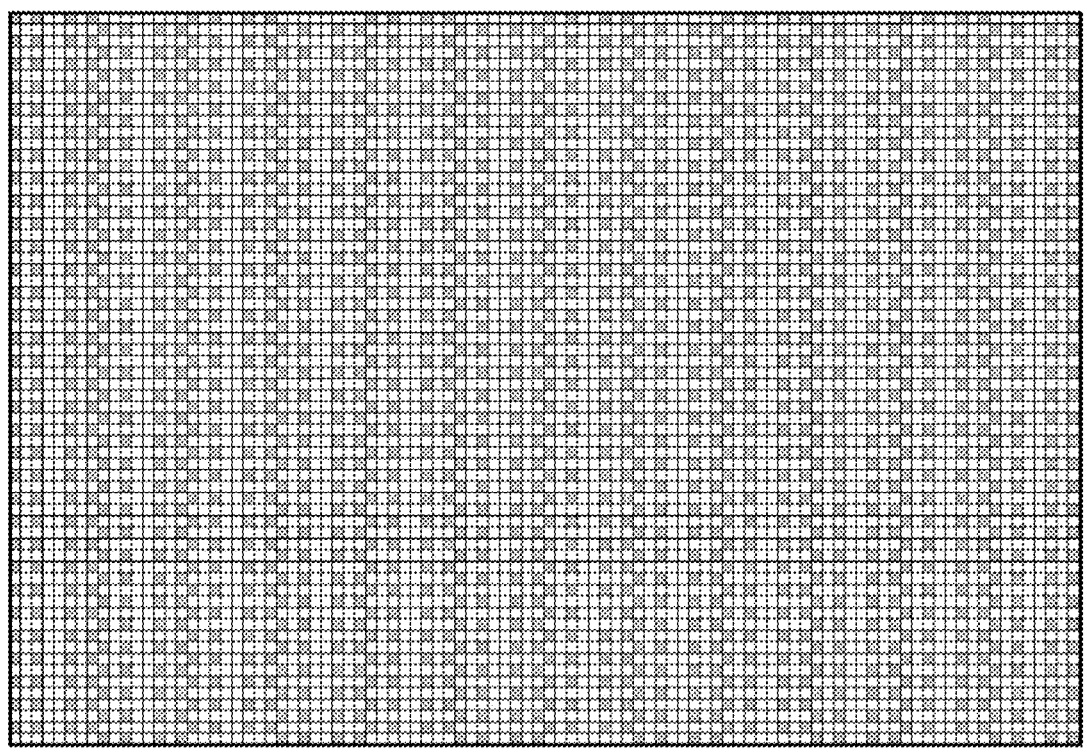
FIG. 12A illustrates a dot pattern.
Figure 12B:
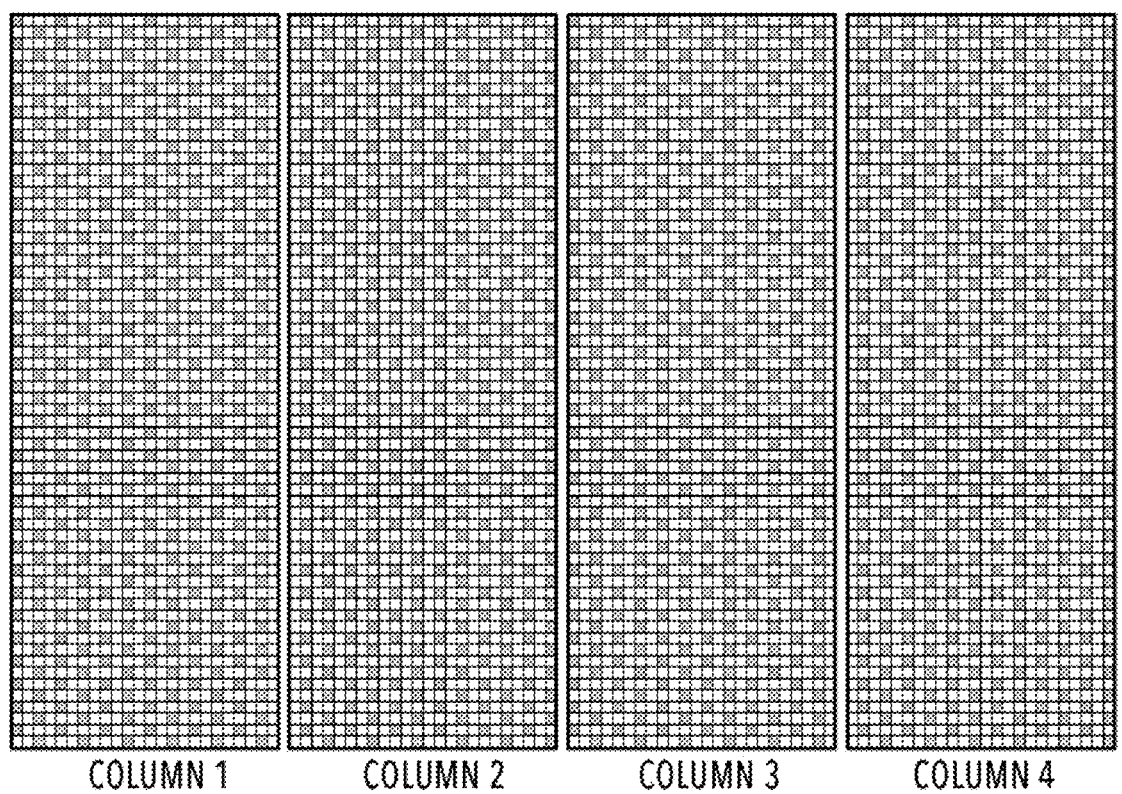
FIG. 12B is a diagram illustrating the state where the dot pattern is divided and distributed to four columns.

FIG. 12A illustrates a dot pattern generated using the dot-arrangement patterns in this embodiment illustrated in FIG. 11 in the case where all of the 600 ppi pixels are at level 2, and FIG. 12B illustrates the state where the dot pattern is divided and distributed to four columns.

FIG. 13A illustrates the results of logical AND operations performed between each piece of column data illustrated in FIG. 12B and the mask patterns described with reference to FIG. 8. Further, FIG. 13B illustrates a comparison of the states of images printed by 4-pass multi-pass printing according to the dot patterns illustrated in FIG. 13A between in the case where a print position error occurs between the first and second nozzle arrays and in the case where no error occurs.

As illustrated in FIG. 13B, in the case where no print position error occurs, two dots are printed one on top of the other at half of the pixels, and no dot is printed at the other half; in the case where a print position error occurs, one dot is printed at each of all the pixels. In this way, although there is a difference in the state of overlaid dots, both images are uniform, and there is no conspicuous texture unique to the mask patterns, unlike the case illustrated in FIG. 10B where the print position error occurs. In other words, use of the dot-arrangement patterns in this embodiment illustrated in FIG. 11 and mask patterns satisfying the two conditions described using FIG. 8 makes it possible to print uniform images even when a print position error occurs between the first nozzle array and the second nozzle array.

In a configuration in which 4-pass multi-pass printing with 4-column thinning is performed using two nozzle arrays, this embodiment described above makes it possible to print uniform images without unevenness even when a print position error occurs between the nozzle arrays.

Second Embodiment

Also in this embodiment, image processing is performed according to the block diagram illustrated in FIG. 3 using the inkjet printing apparatus illustrated in FIGS. 1 and 2. In this embodiment, using the first nozzle array and the second nozzle array which eject ink of the same color, 8-pass multi-pass printing with 4-column thinning is performed. The dot-arrangement patterning process J0007 uses the dot-arrangement patterns illustrated in FIG. 11A. Thus, the dot pattern generated in the case where all of the 600 ppi pixels are at level 2 and the state where the dot pattern is divided and distributed to four columns are illustrated in FIGS. 12A and 12B.

Figures 14A, 14B:
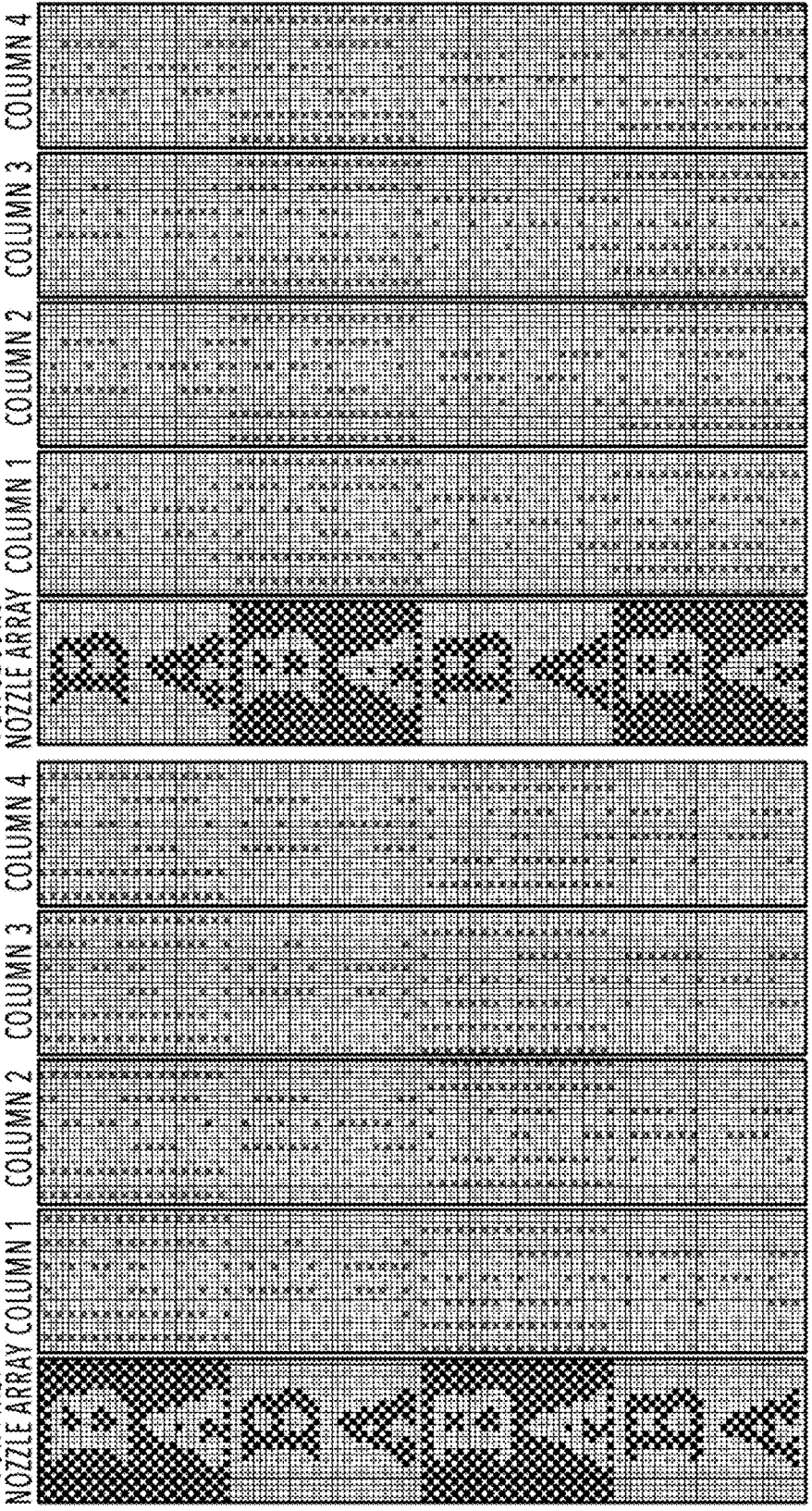
FIGS. 14A and 14B are diagrams illustrating the results of logical AND operations performed between column data and mask patterns.

FIG. 14A illustrates mask patterns used in this embodiment and the results of logical AND operations performed between the mask patterns and each piece of column data illustrated in FIG. 12B. In the case of 8-pass multi-pass printing, the nozzle array region of the print head is divided into eight regions of first to eighth regions, and the print medium is conveyed in the conveyance direction by the distance corresponding to an unit area (corresponding to one region) for every printing scan. Thus, in the case where 8-pass multi-pass printing with 4-column thinning is performed, the image in the unit area on the print medium is completed by performing two printing scans for each of the first column, the second column, the third column, and the fourth column.

Also in this embodiment, mask patterns satisfying the same two conditions as in the first embodiment are prepared. In other words, the mask patterns in this embodiment satisfies the first condition that the mask patterns used by the first and second nozzle arrays which print the same columns in the same printing scan have a complementary relationship in all of the eight print regions. The mask patterns in this embodiment also satisfies the second condition that the mask patterns have a complementary relationship in the combination of the first, third, fifth, and seventh print regions which print dots at the same positions on the print medium and also in the combination of the second, fourth, sixth, and eighth print regions which print dots at the same positions on the print medium.

FIG. 14B illustrates a comparison of the states of images printed by 8-pass multi-pass printing according to the dot patterns illustrated in FIG. 14A between in the case where a print position error occurs between the first and second nozzle arrays and in the case where no error occurs. As in FIG. 13B described in the first embodiment, the images are uniform in both the case where a print position error occurs and the case where no error occurs, and there is no conspicuous texture unique to the mask patterns, unlike the case illustrated in FIG. 10B where the print position error occurs. In other words, use of the dot-arrangement patterns illustrated in FIG. 11 and mask patterns satisfying the above two conditions as illustrated in FIG. 14A makes it possible to print uniform images even when a print position error occurs between the first nozzle array and the second nozzle array.

Third Embodiment

Also in this embodiment, image processing is performed according to the block diagram illustrated in FIG. 3 using the inkjet printing apparatus illustrated in FIGS. 1 and 2. Also as in the first embodiment, using the first nozzle array and the second nozzle array which eject ink of the same color, 4-pass multi-pass printing with 4-column thinning is performed. In this embodiment, the dot-arrangement patterning process J0007 uses dot-arrangement patterns different from those used in the above embodiments.

Figure 15:
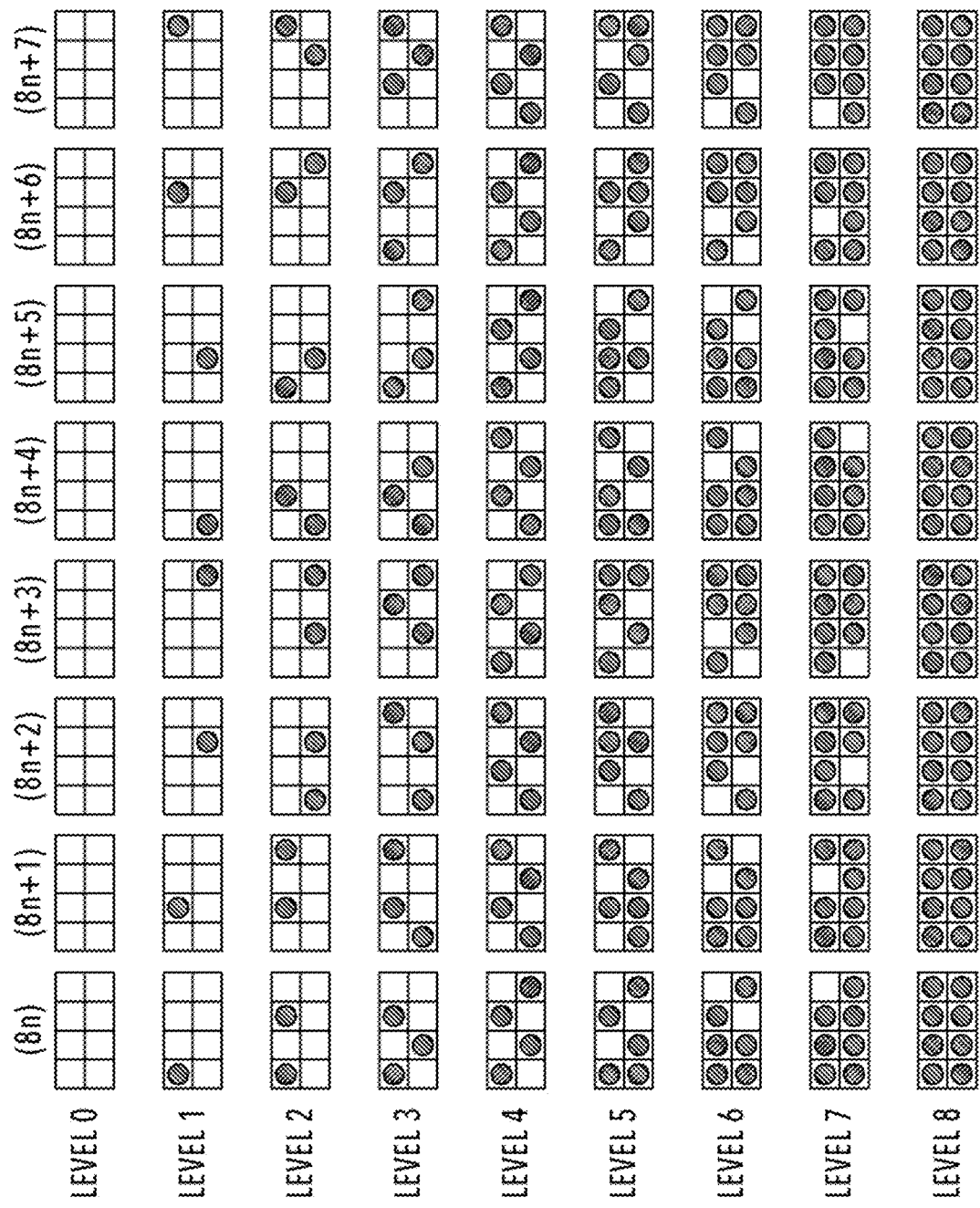
FIG. 15 is a diagram illustrating dot-arrangement patterns of a third embodiment.

FIG. 15 is a diagram illustrating dot-arrangement patterns used in this embodiment. In this embodiment, eight dot patterns (8n) to (8n+7) are prepared for each level and used in the main scanning direction in order. Here, the dot patterns (8n) to (8n+3) are the same as those indicated by (4n) to (4n+3) in FIG. 11A. In addition, the dot patterns (8n+4) to (8n+7) are the same as those indicated by (4n) to (4n+3) in FIG. 4A. In other words, the dot-arrangement patterns in this embodiment have both the characteristics of the dot-arrangement patterns illustrated in FIG. 4A and those of the dot-arrangement patterns illustrated in FIG. 11A.

For the dot-arrangement patterns illustrated in FIG. 11A, a uniform image can be outputted when a steady print position error occurs, such as the print position error between the first nozzle array and the second nozzle array; however, density unevenness may occur when a sudden conveyance error occurs. Specific description will be provided below using FIG. 13.

In the case where neither a sudden conveyance error nor a print position error between the first and second nozzle arrays occurs, the whole area of an image printed by 4-pass multi-pass printing is a uniform image indicated by "NO POSITION ERROR OCCURS" in FIG. 13B. In the case where no sudden conveyance error occurs, but a print position error between the first and second nozzle arrays occurs, the whole area of an image is a uniform image indicated by "POSITION ERROR OCCURS" in FIG. 13B.

However, in the case where a sudden conveyance error occurs during 4-pass multi-pass printing, the image indicated by "NO POSITION ERROR OCCURS" and the image indicated by "POSITION ERROR OCCURS" in FIG. 13B are mixed in the conveyance direction whether a print position error between the nozzle arrays occurs or not. Since there is a difference in the coverage factor (area factor) of dots on a print medium between these two images, visual density difference is recognized between them. Specifically, the density of the image having a large area factor, indicated by "POSITION ERROR OCCURS" is perceived to be higher than that of the image having a small area factor, indicated by "NO POSITION ERROR OCCURS". As a result, the occurrence of a sudden conveyance error causes an abrupt occurrence of a high-density band and a low-density band in a uniform image, which are recognized as the unevenness of density. In particular, in the state where overlaid dots (◉) exist among blank pixels as in level 2 of FIG. 11A, a slight positional error between two dots forming the overlaid dots greatly changes the area factor, which tends to make the unevenness of density conspicuous.

In other words, the dot-arrangement patterns illustrated in FIG. 11A have an effect of making inconspicuous a steady print position error, such as a print position error between the nozzle arrays, but does not have a resistance (robustness) against a sudden print position error such as a conveyance error. On the other hand, in the dot-arrangement patterns illustrated in FIG. 4A, overlaid dots (◉) are not generated up to level 2 as illustrated in FIG. 4B, and two dots are separately positioned in different rows of the raster (upper row and lower row) in the layout. For this reason, even when a sudden print position error occurs, large variation in the area factor is less likely to occur.

Figure 16A:
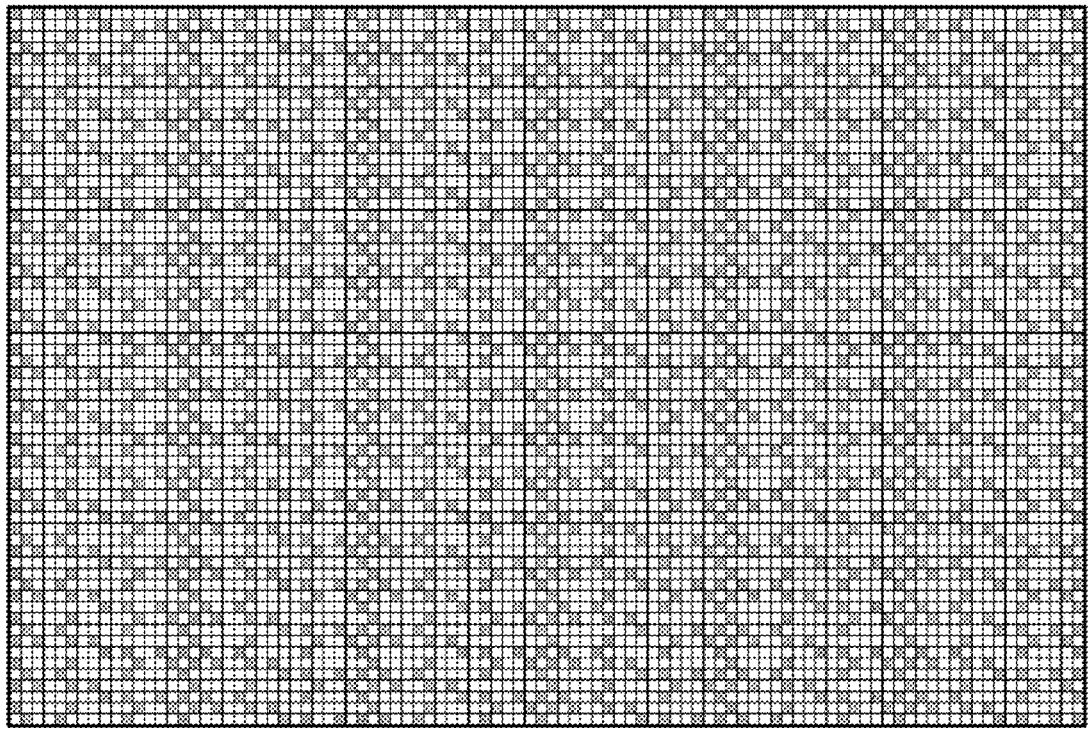
FIG. 16A illustrates a dot pattern.
Figure 16B:
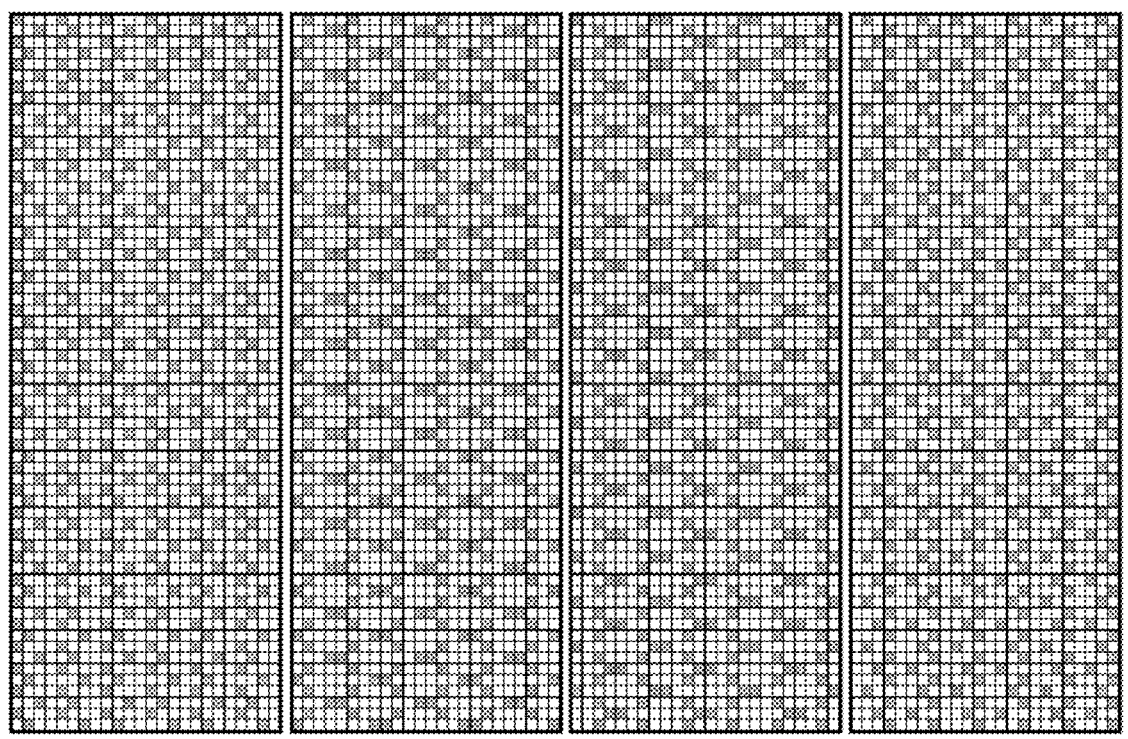
FIG. 16B is a diagram illustrating the state where the dot pattern is divided and distributed to four columns.

FIG. 16A illustrates a dot pattern generated using the dot-arrangement patterns in this embodiment illustrated in FIG. 15 in the case where all of the 600 ppi pixels are at level 2, and FIG. 16B illustrates the state where the dot pattern is divided and distributed to four columns.

FIG. 17A illustrates the results of logical AND operations performed between each piece of the column data illustrated in FIG. 16B and the mask patterns described with reference to FIG. 8. Further, FIG. 17B illustrates a comparison of the states of images printed by 4-pass multi-pass printing according to the dot patterns illustrated in FIG. 17A between in the case where a print position error occurs between the first and second nozzle arrays and in the case where no error occurs.

As illustrated in FIG. 17B, both in the case where a print position error occurs and in the case where no error occurs, pixels at which two dots are printed one on top of the other, pixels at which one dot is printed, and pixels at which no dot is printed are dispersedly mixed, providing a uniform image. In either case, when a sudden conveyance error occurs, there are places where overlaid dots become separated, increasing the area factor, but there are also places where neighboring dots that had not been overlaid are now overlaid, decreasing the area factor. In other words, it can be said that even when a sudden conveyance error occurs, and the image indicated by "NO POSITION ERROR OCCURS" and the image indicated by "POSITION ERROR OCCURS" are mixed, the difference in the area factor between these two images is small, and it is difficult to perceive the difference as the unevenness of density.

As has been described above, this embodiment allows for resistance against both types of print position errors by mixing the dot-arrangement patterns robust against print position errors between the nozzle arrays as illustrated in FIG. 15 and the dot-arrangement patterns robust against sudden conveyance errors.

Note that in FIG. 15, among the dot-arrangement patterns prepared, half of them are ones robust against print position errors between the nozzle arrays, and the other half are ones robust against sudden conveyance errors; however, this ratio may be changed as appropriate. For example, in the case where conveyance errors are more conspicuous on an image than print position errors between the nozzle arrays, it is preferable that five or more of the eight dot-arrangement patterns be the dot-arrangement patterns robust against sudden conveyance errors, and that the remaining patterns be the dot-arrangement patterns robust against print position errors between the nozzle arrays. On the other hand, in the case where print position errors between the nozzle arrays occur more often than conveyance errors, it is preferable that five or more of the eight dot-arrangement patterns be the dot-arrangement patterns robust against print position errors between the nozzle arrays, and that the remaining patterns be the dot-arrangement patterns robust against sudden conveyance errors. It is a matter of course that the number of kinds of dot-arrangement pattern prepared in association with each level is not limited to eight. More patterns may be prepared, or of the four kinds of dot-arrangement pattern as in the above embodiments, the dot-arrangement patterns robust against print position errors between the nozzle arrays and the dot-arrangement patterns robust against sudden conveyance errors may be mixed. In general, preparing a larger number of dot-arrangement patterns is effective to make the ejection frequencies of all the nozzles equal and to disperse various noises unique to the printing apparatus.

In the above embodiments, the description has been provided using the mask patterns in which print-permitted pixels and print-not-permitted pixels are arranged to show the inverted characters (A, B, C, and D) to make the effects easy to understand. However, it is a matter of course that the present invention is not limited to such mask patterns. The mask patterns satisfying the above first and second conditions can be set in any way without losing the effects of the present invention. For example, gradation masks or the like, which are commonly used to improve the robustness against conveyance errors, may be suitably used.

In addition, although in the above, the description has been provided as examples for the case of 4-pass or 8-pass multi-pass printing with 4-column thinning, the present invention is not limited to this method. Even for N-column thinning, where N is an integer of 4 or more, the present invention functions effectively as long as the print areas corresponding to the columns for printing at the same positions on a print medium have complementary relationships. The methods of the above embodiments can be suitably applied to any configurations in which M-pass multi-pass printing is used where M is a number at least larger than or equal to the number of columns, each of the nozzle arrays is divided into M print areas, and a unit area of the print medium is printed by M printing scans.

Although in the above, the description has been provided as an example for the color inkjet printing apparatus illustrated in FIGS. 1A and 1B, the present invention is not limited to this type of printing apparatus. For example, even for inkjet printing apparatuses dedicated to monochrome printing using only black ink, if the printing apparatus includes multiple nozzle arrays for ejecting the black ink, the present invention functions effectively.

Further, in the above, the description has been provided, with reference to FIG. 3, for the case where the host apparatus performs the processes up to the halftoning, and the printing apparatus performs the processes from the dot-arrangement patterning process. However, the present invention is not limited to this method. The printer driver of the host apparatus may perform the processes up to the mask data conversion process and transmit the generated ejection data to the printing apparatus. Alternatively, the printing apparatus may perform all the processes from the front-end process. In any case, the apparatus that uses the characteristic mask patterns of the present invention to perform the mask data conversion process is an image processing apparatus of the present invention.

Another Example

The present invention can be realized by the process in which a program for implementing one or more functions of the above embodiments is provided to a system or an apparatus via a network or a storage media, and one or more processors of a computer in the system or the apparatus read and execute the program. The present invention can also be realized by circuitry that implements one or more functions (for example, an ASIC).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-241107 filed Dec. 15, 2017, which is hereby incorporated by reference wherein in its entirety.

What is claimed is:

1. An image processing apparatus generating ejection data for printing an image on a print medium, the image being printed on the print medium by repeating a printing scan and a conveyance operation alternately, the printing scan being an operation of using a first nozzle array and a second nozzle array each having a predetermined number of nozzles arrayed in a predetermined direction, each nozzle configured to eject a same color ink, and scanning the first nozzle array and the second nozzle array in a scanning direction intersecting the predetermined direction while causing each nozzle to eject the ink toward the print medium, the conveyance operation being an operation of conveying the print medium in a conveying direction intersecting the direction of the printing scan by a distance corresponding to each of M print regions obtained by dividing the predetermined number of the nozzles into M regions in the predetermined direction, M being an integer of four or more, and the image processing apparatus comprising:

a receiving unit configured to receive print data indicating the image, and an ejection data generation unit that generates first ejection data that defines a pixel at which the first nozzle array prints a dot and a pixel at which the first nozzle array does not print a dot and generates second ejection data that defines a pixel at which the second nozzle array prints a dot and a pixel at which the second nozzle array does not print a dot, based on the print data, wherein a position at which a dot is printed of a pixel indicated by the first ejection data and a position at which a dot is printed of a pixel indicated by the second ejection data have (i) mutually complementary relationships among the M print regions, respectively, and (ii) a mutually complementary relationship in each of the M print regions.

2. The image processing apparatus according to claim 1, wherein N pieces of column data that are binary dot data adjacent in the scanning direction are printed by different scans of the printing scan respectively, and each of N pieces of column data obtained by thinning binary dot data in every N-th column, N being an integer between four and M inclusive, is printed by a different scan of the printing scan.

3. The image processing apparatus according to claim 2, further comprising a dot-data generation unit that generates the binary dot data based on multi-level image data,
wherein the dot-data generation unit determines dot-printing or dot-not-printing for each column, such that dots are printed with one on top of the other at the same pixel position on the print medium, regardless of tone level of the image data.

4. The image processing apparatus according to claim 2, further comprising a dot-data generation unit that generates the binary dot data based on multi-level image data,
wherein the dot-data generation unit determines dot-printing or dot-not-printing for each column such that an area where dots are printed with one on top of the other at the same pixel position on the print medium and an area where dots are separately printed at different pixel positions on the print medium are appeared, regardless of tone level of the image data.

5. The image processing apparatus according to claim 2, wherein each of the M and the N is four.

6. The image processing apparatus according to claim 2, wherein the M is eight, and the N is four.

7. The image processing apparatus according to claim 1, wherein in the M printing scans, a scan in a forward direction and a scan in a backward direction are performed alternately, and
in each of a position at which a dot is printed of a pixel indicated by the first ejection data and a position at which a dot is printed of a pixel indicated by the second ejection data, a combination of print regions, of the M print regions, for printing dots at the same position on the print medium in a printing scan in the same direction has a mutually complementary relationship.

8. The image processing apparatus according to claim 1, wherein the number of pixels at which a dot is printed defined by the first ejection data and the number of pixels at which a dot is printed defined by the second ejection data are the same in each of the M print regions.

9. The image processing apparatus according to claim 1, further comprising a printing unit that prints an image on the print medium using the first nozzle array and the second nozzle array according to the first ejection data and the second ejection data generated by the ejection data generation unit.

10. An image processing method of generating ejection data for printing an image on a print medium,
wherein the image is printed on the print medium by repeating a printing scan and a conveyance operation alternately,
the printing scan being an operation of using a first nozzle array and a second nozzle array each having a predetermined number of nozzles arrayed in a predetermined direction, each nozzle configured to eject a same color ink, and scanning the first nozzle array and the second nozzle array in a direction intersecting the predetermined direction while causing each nozzle to eject the ink toward the print medium,
the conveyance operation being an operation of conveying the print medium in a conveying direction intersecting the direction of the printing scan by a distance corresponding to each of M print regions obtained by dividing the predetermined number of the nozzles into M regions, M being an integer of four or more, and
the image processing method comprising:
receiving print data indicating the image,
generating first ejection data for the first nozzle array that defines a pixel at which the first nozzle array prints a dot and a pixel at which the first nozzle array does not print a dot, and
generating second ejection data for the second nozzle array that defines a pixel at which the second nozzle array prints a dot and a pixel at which the second nozzle array does not print a dot, based on the print data,
wherein a position at which a dot is printed of a pixel indicated by the first ejection data and a position at which a dot is printed of a pixel indicated by the second ejection data have (i) mutually complementary relationships among the M print regions, respectively, and (ii) a mutually complementary relationship in each of the M print regions.

11. The image processing method according to claim 10, wherein N pieces of column data that are binary dot data adjacent in the scanning direction are printed by different scans of the printing scan respectively, and each of N pieces of column data obtained by thinning binary dot data in every N-th column, N being an integer between four and M inclusive, is printed by a different scan of the printing scan.

12. The image processing method according to claim 11, further comprising generating the binary dot data based on multi-level image data,
wherein dot-printing or dot-not-printing of the binary dot data for each column is determined, such that dots are printed with one on top of the other at the same pixel position on the print medium, regardless of tone level of the image data.

13. The image processing method according to claim 11, further comprising generating the binary dot data based on multi-level image data,
wherein dot-printing or dot-not-printing of the binary dot data for each column such that an area where dots are printed with one on top of the other at the same pixel position on the print medium and an area where dots are separately printed at different pixel positions on the print medium are appeared, regardless of tone level of the image data.

14. The image processing method according to claim 11, wherein each of the M and the N is four.

15. The image processing method according to claim 11, wherein the M is eight, and the N is four.

16. The image processing method according to claim 10, wherein in the M printing scans, a scan in a forward direction and a scan in a backward direction are performed alternately, and
in each of a position at which a dot is printed of a pixel indicated by the first ejection data and a position at which a dot is printed of a pixel indicated by the second ejection data, a combination of print regions, of the M print regions, for printing dots at the same position on the print medium in a printing scan in the same direction has a mutually complementary relationship.

17. The image processing method according to claim 10, wherein the number of pixels at which a dot is printed defined by the first ejection data and the number of pixels at which a dot is printed defined by the second ejection data are the same in each of the M print regions.

18. The image processing method according to claim 10, further comprising printing an image on the print medium using the first nozzle array and the second nozzle array according to the first ejection data and the second ejection data.

19. A non-transitory computer readable storage medium storing a program which causes a computer to execute a method of generating ejection data for printing an image on a print medium,
wherein the image is printed on the print medium by repeating a printing scan and a conveyance operation alternately,
the printing scan being an operation of using a first nozzle array and a second nozzle array each having a predetermined number of nozzles arrayed in a predetermined direction, each nozzle configured to eject a same color ink, and scanning the first nozzle array and the second nozzle array in a direction intersecting the predetermined direction while causing each nozzle to eject the ink toward the print medium,
the conveyance operation being an operation of conveying the print medium in a conveying direction intersecting the direction of the printing scan by a distance corresponding to each of M print regions obtained by dividing the predetermined number of the nozzles into M regions, M being an integer of four or more, and
the image processing method comprising:
receiving print data indicating the image,
generating first ejection data for the first nozzle array that defines a pixel at which the first nozzle array prints a dot and a pixel at which the first nozzle array does not print a dot, and
generating second ejection data for the second nozzle array that defines a pixel at which the second nozzle array prints a dot and a pixel at which the second nozzle array does not print a dot, based on the print data,
wherein a position at which a dot is printed of a pixel indicated by the first ejection data and a position at which a dot is printed of a pixel indicated by the second ejection data have (i) mutually complementary relationships among the M print regions, and (ii) a mutually complementary relationship in each of the M print regions.

20. The storage medium according to claim 19, wherein N pieces of column data that are binary dot data adjacent in the scanning direction are printed by different scans of the printing scan respectively, and each of N pieces of column data obtained by thinning binary dot data in every N-th column, N being an integer between four and M inclusive, is printed by a different scan of the printing scan.

21. The storage medium according to claim 20, wherein the image processing method further comprises generating the binary dot data based on multi-level image data, wherein
dot-printing or dot-not-printing of the binary dot data for each column is determined, such that dots are printed with one on top of the other at the same pixel position on the print medium, regardless of tone level of the image data.

22. The storage medium according to claim 20, wherein the image processing method further comprises generating the binary dot data based on multi-level image data, wherein
dot-printing or dot-not-printing of the binary dot data for each column such that an area where dots are printed with one on top of the other at the same pixel position on the print medium and an area where dots are separately printed at different pixel positions on the print medium are appeared, regardless of tone level of the image data.

23. The storage medium according to claim 20, wherein each of the M and the N is four.

24. The storage medium according to claim 20, wherein the M is eight, and the N is four.

25. The storage medium according to claim 19, wherein in the M printing scans, a scan in a forward direction and a scan in a backward direction are performed alternately, and
in each of a position at which a dot is printed of a pixel indicated by the first ejection data and a position at which a dot is printed of a pixel indicated by the second ejection data, a combination of print regions, of the M print regions, for printing dots at the same position on the print medium in a printing scan in the same direction has a mutually complementary relationship.

26. The storage medium according to claim 19, wherein the number of pixels at which a dot is printed defined by the first ejection data and the number of pixels at which a dot is printed defined by the second ejection data are the same in each of the M print regions.

27. The storage medium according to claim 19, wherein the image processing method further comprises printing an image on the print medium using the first nozzle array and the second nozzle array according to the first ejection data and the second ejection data.

* * * * *